United States Patent
Shellshear

(10) Patent No.: US 9,633,265 B2
(45) Date of Patent: Apr. 25, 2017

(54) METHOD FOR IMPROVING TRACKING IN CROWDED SITUATIONS USING RIVAL COMPENSATION

(71) Applicant: CANON KABUSHIKI KAISHA, Tokyo (JP)

(72) Inventor: Andrew John Shellshear, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 14/508,955

(22) Filed: Oct. 7, 2014

(65) Prior Publication Data

US 2015/0104066 A1    Apr. 16, 2015

(30) Foreign Application Priority Data

Oct. 10, 2013  (AU) .................................. 2013242830

(51) Int. Cl.
   G06K 9/00       (2006.01)
   G06T 7/20       (2017.01)
   G06K 9/46       (2006.01)

(52) U.S. Cl.
   CPC .......... *G06K 9/00778* (2013.01); *G06T 7/208* (2013.01); *G06K 9/4642* (2013.01); *G06T 2207/30196* (2013.01)

(58) Field of Classification Search
   CPC . G06T 2207/10016; G06T 2207/30196; G06T 2207/20144; G06T 2207/30232; G06T 2207/20221; G06T 2210/21; G06K 9/00771; G06K 9/00711; G06K 9/32; G06K 9/3241; G06K 9/6278; G06K 2009/3225; G06K 2009/3291
   See application file for complete search history.

(56) References Cited

U.S. PATENT DOCUMENTS

| | | | |
|---|---|---|---|
| 6,542,621 | B1 | 4/2003 | Brill et al. |
| 8,218,819 | B2 | 7/2012 | Cobb et al. |
| 8,345,102 | B2 | 1/2013 | Huang et al. |
| 2008/0166045 | A1* | 7/2008 | Xu .................... G06K 9/00771 382/170 |

(Continued)

FOREIGN PATENT DOCUMENTS

WO     2008/008046 A1    1/2008

OTHER PUBLICATIONS

Gabriel, P. et al., "The State of the Art in Multiple Object Tracking Under Occlusion in Video Sequences", Advanced Concepts for Intelligent Vision Systems (ACIVS), IEEE, Jan. 2003.

(Continued)

*Primary Examiner* — Eueng-Nan Yeh
(74) *Attorney, Agent, or Firm* — Canon USA, Inc. IP Division

(57) ABSTRACT

A method for tracking objects across a number of image frames includes tracking objects in the frames based on appearance models of each foreground region corresponding to each of the objects and determining if a plurality of the tracked objects overlap. Where a plurality of the tracked objects overlap, the method creates compensated appearance models for each of the plurality of overlapping objects by attenuating common appearance features among the corresponding appearance models; and tracks the plurality of overlapping objects based on the created compensated appearance models.

8 Claims, 15 Drawing Sheets

(56) References Cited

U.S. PATENT DOCUMENTS

2012/0019728 A1 1/2012 Moore
2012/0148093 A1* 6/2012 Sharma .............. G06K 9/00771
　　　　　　　　　　　　　　　　　　　　　　　382/103

OTHER PUBLICATIONS

Yang, T. et al., "Real-time Multiple Objects Tracking with Occlusion Handling in Dynamic Scenes", IEEE Computer Society Conference on Computer Vision and Pattern Recognition, 2005 (CVPR 2005), vol. 1, pp. 970-975, Jun. 20-25, 2005.
McKenna et al., "Tracking Groups of People". Computer Vision and Image Understanding, Oct. 2000, pp. 42-56.
Li et al., "Improved mean shift algorithm for occlusion pedestrian tracking"; Electronics Letters, May 8, 2008, vol. 44, No. 10, pp. 622-623.
Bradski, Gary R., "Computer Vision Face Tracking for Use in a Perceptual User Interface"; Intel Technology Journal Q2, 1998, pp. 1-15, (published before this application Oct. 2014).
Collins et al., "Algorithms for Cooperative Multisensor Surveillance"; Proceedings of the IEEE, vol. 89, No. 10, Oct. 2001, pp. 1456-1477.
Broida et al., "Estimation of Object Motion Parameters from Noisy Images", IEEE Transactions on Pattern Analysis and Machine Intelligence, vol. PAMI-8, No. 1, Jan. 1986, pp. 90-99.
Shi et a., "Good Features to Track"; IEEE Conference on Computer Vision and Pattern Recognition (CVPR94), Seattle, Jun. 1994, pp. 593-600.
Comaniciu et al., "Kernel-Based Object Tracking"; IEEE Transaction on Pattern Analysis and Machine Intelligence, vol. 25, Issue 5, May 2003, pp. 1-30.
Elgammal et al., "Non-parametric Model for Background Subtraction"; ECCV '00 Proceedings of the 6th European Conference on Computer Vision-Part II, pp. 751-767 (Jun. 2000).
Wren et al., "Pfinder: Real-Time Tracking of the Human Body"; IEEE Transactions on Pattern Analysis and Machine Intelligence, vol. 19, No. 7, Jul. 1997, pp. 780-785.

* cited by examiner

METHOD FOR IMPROVING TRACKING IN CROWDED SITUATIONS USING RIVAL COMPENSATION

REFERENCE TO RELATED PATENT APPLICATION(S)

This application claims the benefit under 35 U.S.C. §119 of the filing date of Australian Patent Application No. 2013242830, filed Oct. 10, 2013, hereby incorporated by reference in its entirety as if fully set forth herein.

TECHNICAL FIELD

The present disclosure relates generally to video analytics and, in particular, to a method, system and apparatus for tracking video objects in the presence of other nearby video objects.

BACKGROUND

There is a long history of video analytic technologies designed to analyse digital video and track video objects.

Many video tracking systems use some forms of foreground separation to work out what is moving in the scene, and what is stationary. This can be as simple as looking at the pixel differences between each frame ("frame differencing"), and can get quite complex, taking into account obfuscating factors such as camera movement, shadows, reflections, and background movements such as water ripples, tree movement, and escalator movement.

Foreground separation can be used as input to a geometric tracker (i.e. a tracker that treats each connected foreground region as an object to be tracked). Point tracking methods such as Kalman filters can then be used to track the objects. Such a tracker works well on individual objects moving through the scene but is poor at following tracks that touch each other, as it does not distinguish foreground objects from each other.

Visual Signature Algorithms (also known as Kernel Trackers) are algorithms capable of tracking objects by analysing the scene for objects of a similar appearance to the known tracks. Existing Visual Signature Algorithms include Mean-Shift, CamShift, and KLT.

The Mean-shift tracker is a Visual Signature algorithm that requires initialisation with an Exemplar Image of an object. An exemplar image is the region of an image representing the object to be tracked. The exemplar image can be provided either by a geometric tracker or a specialised detector, e.g. a Human Body Detection algorithm. The mean-shift tracker then creates a Model Histogram, a histogram of the exemplar image. Many different histogram types are possible, including three dimensional pixel histograms of RGB or YCbCr, one dimensional pixel histograms of Hue (ignoring pixels with brightness or saturation below a fixed threshold), and higher dimensional histograms that take into account such features as luma gradients and textures.

Then, on each subsequent video frame, the mean-shift tracker creates a Back Projection, being a Probability Density Function (PDF) of the video frame, mapping each pixel or area of the current video frame to a corresponding normalised histogram value. Then, starting at the predicted location of the track, a mean-shift procedure (an iterated shifting of the centroid of the object using the first moment of values of the back projection within a bounding box of the object) is used to find a local maxima of the PDF. The predicted location of the track can simply be the same position as in the previous frame, or it could take into account known behaviour of the track so far (e.g. using a Kalman filter).

The mean-shift algorithm is also able to give an approximate confidence of the determined tracking, by examining the absolute strength of the PDF with the bounding box, penalised by the strength of the PDF in the immediate area outside the bounding box.

The mean-shift tracker has some useful properties. The use of histograms means that the mean-shift tracker is invariant to rotation and (to a lesser degree) scale and deformation of the objects. The mean-shift tracker is also computationally efficient compared with other Visual Signature algorithms.

The mean-shift tracker however has a number of limitations.

The mean-shift tracker has a limited ability to deal with occlusions. The mean-shift algorithm does not adjust the histogram to what it expects to see, thus when a track is partially occluded, there is a greater probability of losing the track. Even if the algorithm continues to track successfully, the predicted position of the track does not take into account the occlusion, which can be a problem for any subsequent process that requires an accurate bounding box for the object.

One attempt to address this issue assumes the track with the lowest low point occludes the other tracks, when the predicted bounding boxes of tracks overlap. Then, when calculating the histogram for the occluded track's exemplar image, those pixels that are geometrically expected to be occluded are excluded. This method potentially works well as long as the predicted bounding boxes are accurate. However, if the predicted lowest low point is incorrect, data from the wrong histogram could be excluded, resulting in even more erroneous position estimates.

Another significant limitation of the mean-shift tracker is that if the histogram peaks of an object also appear in other nearby objects or in background areas of the image, the algorithm can incorrectly identify areas of the track.

A simple way to avoid including background pixels is to centre-weight the histogram data. A common improvement is to exclude or penalise nearby background areas as defined as the area immediately outside the bounding box or the foreground area associated with the track, when creating histograms and/or back projections.

One approach to deal with nearby objects is by assigning a probability to each pixel of an ambiguous region, using the relative histogram strengths of the candidate exemplar images. However, the mean-shift step will still be prone to mistakes if there are substantial similarities in appearances between the objects.

There is a need for a tracker that is more robust to tracking objects when there are other visually similar objects nearby.

SUMMARY

According to one aspect of the present disclosure, there is provided a method for tracking objects across a number of image frames, the method comprising:

tracking objects in the frames based on appearance models of each foreground region corresponding to each of the objects;

determining if a plurality of the tracked objects overlap;

where a plurality of the tracked objects overlap, creating compensated appearance models for each of the plurality of overlapping objects by attenuating common appearance features among the corresponding appearance models; and tracking the plurality of overlapping objects based on the created compensated appearance models.

Preferably, the creating compensated appearance models further comprises, for a current tracked object being one of the overlapping objects, creating a rival compensated appearance model for the remaining overlapping objects; and the tracking of the plurality of overlapping objects comprises, for the current tracked object, comparing the compensated appearance model of the current tracked object with the rival compensated appearance model of the remaining overlapping objects.

Alternatively, the tracking of objects in the frames comprises, for a first object, obtaining and storing an exemplar view for the first object and an associated appearance model thereof in a first image frame; and the creating compensated appearance models comprises forming, in association with a second image frame, an adjusted appearance model of the first object based on the associated appearance model of the first object and an appearance model of at least one nearby second object; the method further comprising:

determining a scale and centroid adjustment of the exemplar view based on the adjusted appearance model;

applying tracking to the first object in the second image to determine a position of the first object in the second image; and correcting the position of the first object in the second image according to the determined scale and centroid adjustment.

According to another aspect there is provided a method for tracking a first object across a number of images, the method comprising:

obtaining and storing an exemplar view for the first object and an associated appearance model thereof in a first image;

forming, in association with a second image, an adjusted appearance model of the first object based on the associated appearance model of the first object and an appearance model of at least one nearby second object;

determining a scale and centroid adjustment of the exemplar view based on the adjusted appearance model;

applying tracking to the first object in the second image to determine a position of the first object in the second image; and correcting the position of the first object in the second image according to the determined scale and centroid adjustment.

In another aspect, provided is method for tracking a first object across a number of images, the method comprising:
obtaining and storing an exemplar view for the first object and an associated appearance model thereof in a first image;
forming, in association with a second image, an adjusted appearance model of the first object based on the associated appearance model of the first object and an appearance model of at least one nearby second object;

determining a centroid adjustment of the exemplar view based on the adjusted appearance model;

applying tracking to the first object in the second image to determine a position of the first object in the second image; and correcting the position of the first object in the second image according to the determined centroid adjustment.

Desirably the adjusted appearance model comprises a compensated appearance model formed by attenuating common appearance features amongst the corresponding appearance models of at least the nearby second object.

Other aspects are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Context

Presently disclosed is a method for improving the ability of a video tracking system to track in the presence of objects with similar appearances.

Figure 1A:
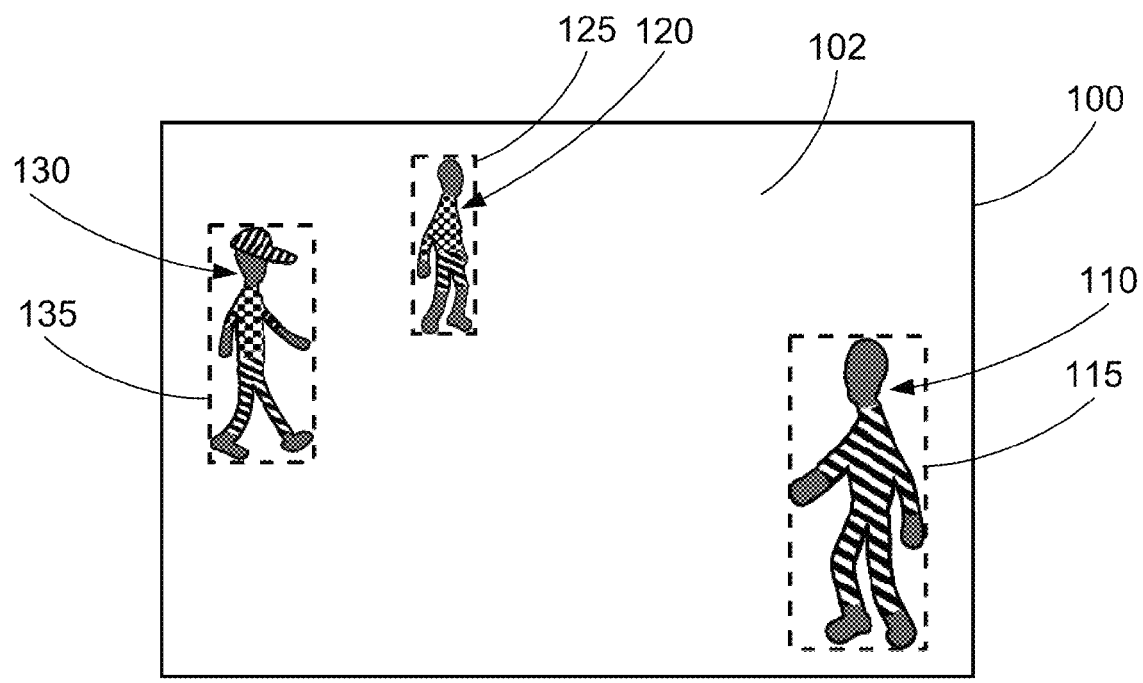
FIGS. 1A and 1B show two video frames of a video sequence in which three people are walking.

Consider the case of tracking a person using a mean-shift algorithm in the presence of other people with similar appearances. FIG. 1A shows a video frame 100, for example captured by one of the cameras 1427a-1427c (e.g. 1427a), which contains representations of three people, one person 110 wearing a distinctive coloured full-bodied outfit indicated by north-west diagonal stripes, another person 120 wearing a top (e.g. shirt) of another distinctive colour indicated by a checkerboard pattern, and shorts of the same colour as the outfit of the person 110, and a third person 130 wearing trousers of the same colour as the shorts of the person 120 and the outfit of the person 110, a top of the same colour as that of the person 120, and a distinctively coloured hat, as indicated by north-east diagonal stripes. For this example, the colours and features of the background 102 are ignored. The representation of each person 110, 120, 130 is surrounded by a corresponding bounding box 115, 125 and 135. The bounding boxes 115, 125 and 135 also represent exemplar images of each of the people for the video frame 100, and thus form corresponding video objects upon which processing and tracking may be performed.

Figure 1B:
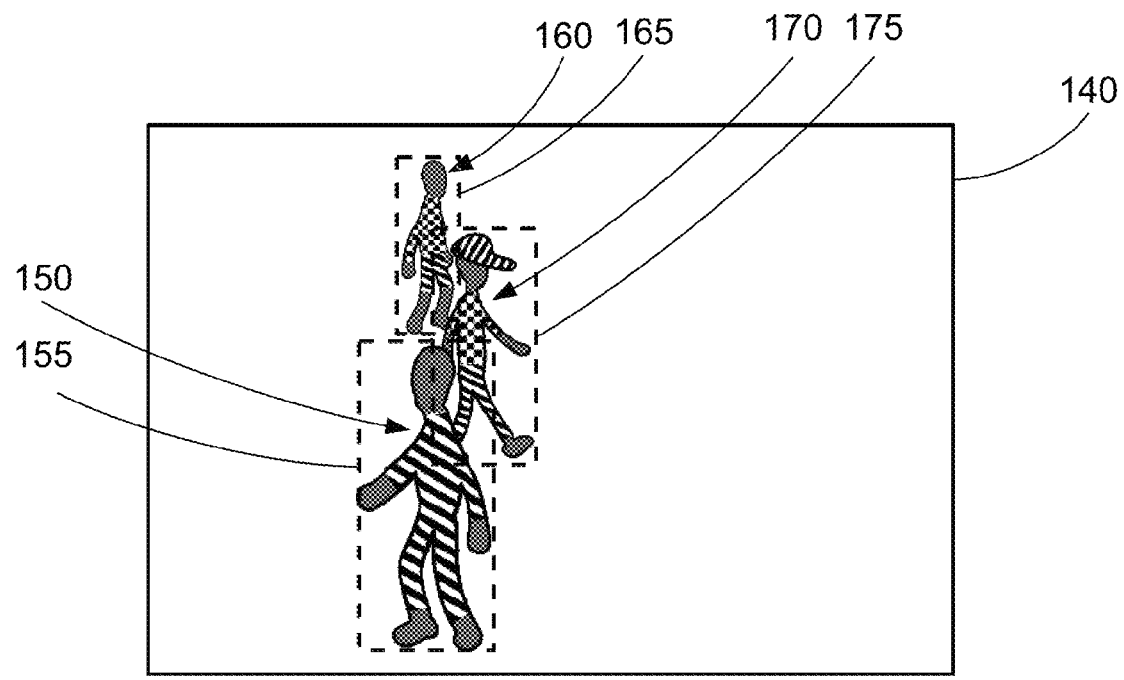

FIG. 1B shows a subsequent frame 140 of the video sequence captured by the camera 1427a. In the subsequent frame 140, the three people 110, 120, 130 have moved and are captured as people 150, 160, 170 such that they now overlap each other, being representative of a crowded situation. The subsequent frame 140 may be a frame immediately following the frame 100, but in the example illustrated, the subsequent frame 140 is one captured by the camera 1427a perhaps 3-5 seconds after the frame 100. The tracking arrangements described herein are performed across a number of image frames, being at least two frames and typically more, but not necessarily consecutively captured frames at video frame rates of 25 or 30 frames per second. For surveillance, fixed capture rates may be 1 frame per second, or one frame every 5 seconds. Capture rates need not be uniform, for example where capture is motion sensitive. The corresponding bounding boxes 155, 165 and 175 are also shown. For simplicity in illustrating this example these bounding boxes also represent predicted track positions based on prior track information associated with a track of the object for which there is a corresponding bounding box. In reality however, it would not be expected that these predictions would be so accurate.

Figure 2A:
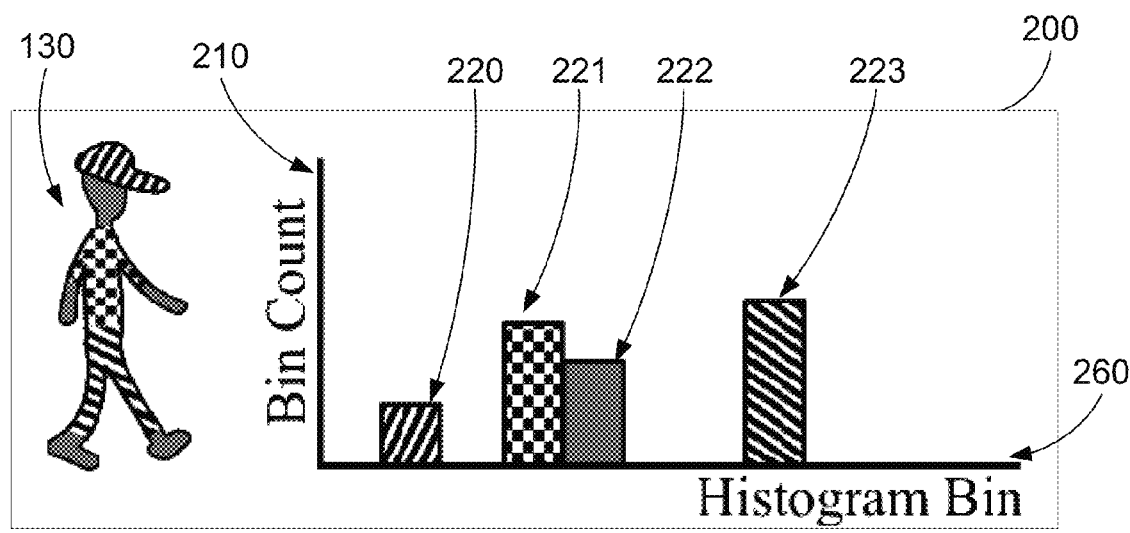
FIGS. 2A to 2C show histograms for exemplar images of each of the three people featured in FIGS. 1A and 1B.
Figure 2B:
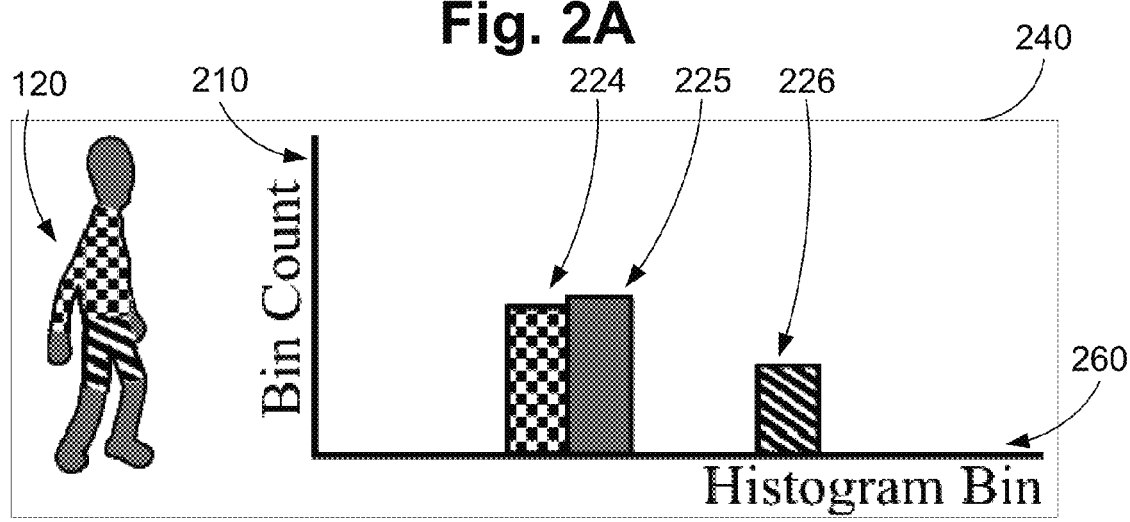
Figure 2C:
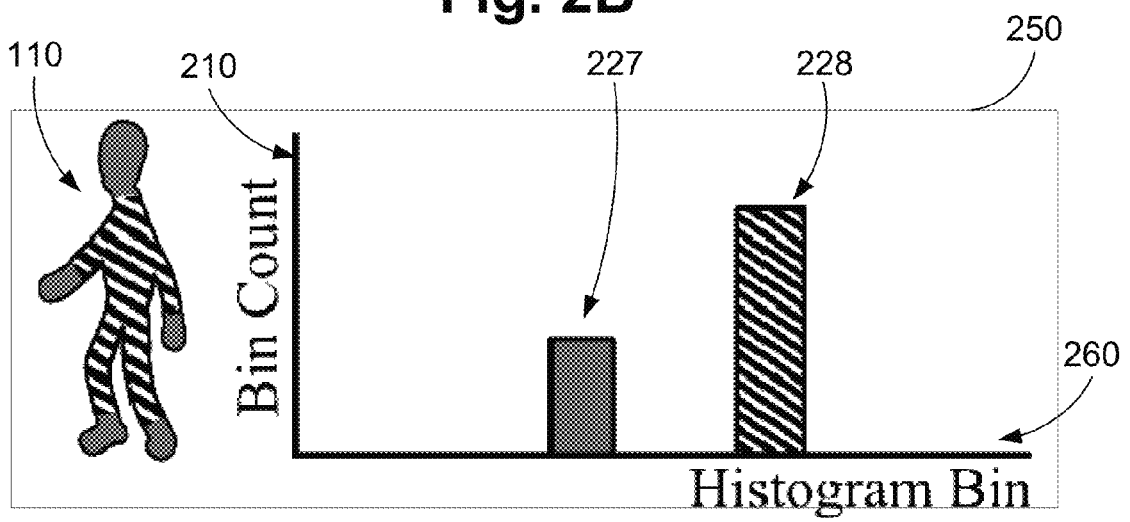

FIGS. 2A to 2C show histograms for the exemplar image of each person captured in the first frame 100. FIG. 2A shows a histogram 200 for exemplar image 135, FIG. 2B shows a histogram 240 for exemplar image 125 and FIG. 2C shows a histogram 250 for the exemplar image 115. The example shows a one-dimensional histogram for each track with bin count 210 on the vertical axis and histogram bin 260 on the horizontal axis, where the histogram bars 220 to 228 represent the number of pixels of each part of the exemplar image. Specifically, the bar 220 relating to the hat of the third person 130; the bars 221 and 224 relating to the shirts of people 130 and 120; the bars 222, 225 and 227 relating to the skin colour of each person, and the bars 223, 226 and 228 relating to the trousers of person 130, the shorts of the person 120 and the outfit of the person 110. In FIGS. 2A to 2C, the colour appearance feature associated with the bin values 223, 226 and 228 is a common appearance feature amongst the histograms. The histograms are examples of appearance models for the objects associated with the persons 110, 120 and 130. The objects are typically represented by the bounding boxes 115, 125 and 135. Specifically, the bin values of a histogram provide colour appearance features of the appearance model for the corresponding object, thereby permitting comparisons between objects through comparison of the respective appearance models. This, in general, permits the tracking of objects across a number of frames based on appearance models and, more specifically, using models developed from appearances from the histories of tracks associated with objects.

Figure 3A:
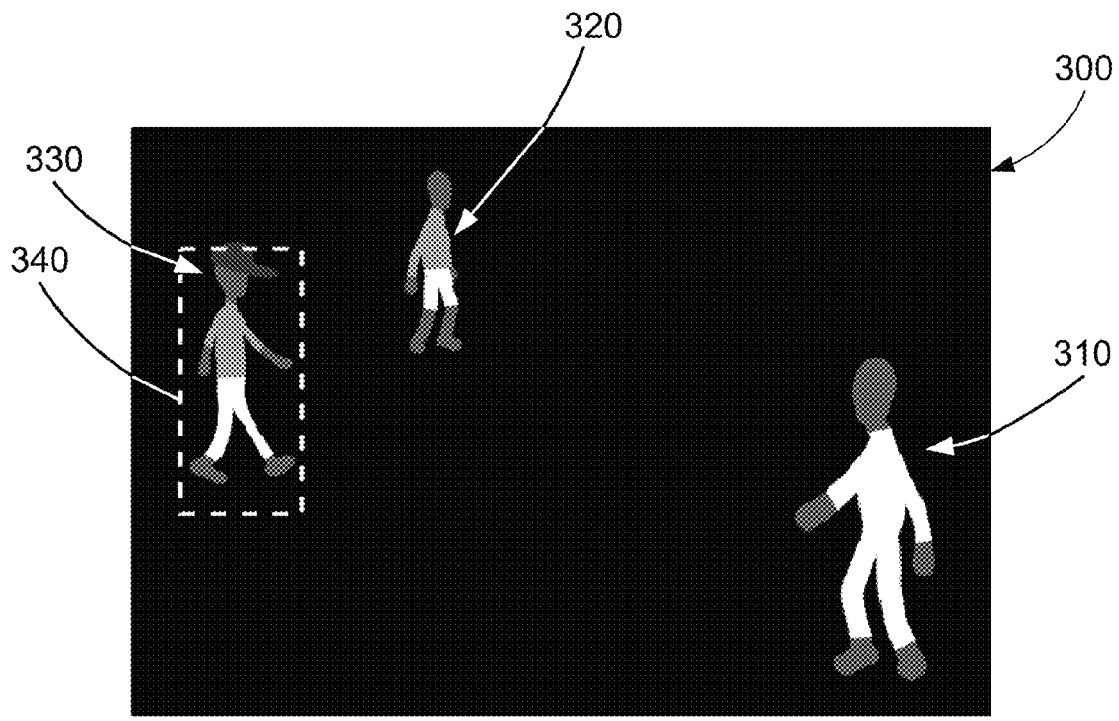
FIGS. 3A and 3B illustrate back projections and mean-shift predicted bounding boxes for the two video frames of FIGS. 1A and 1B using the histogram 200 of one person 130.
Figure 3B:
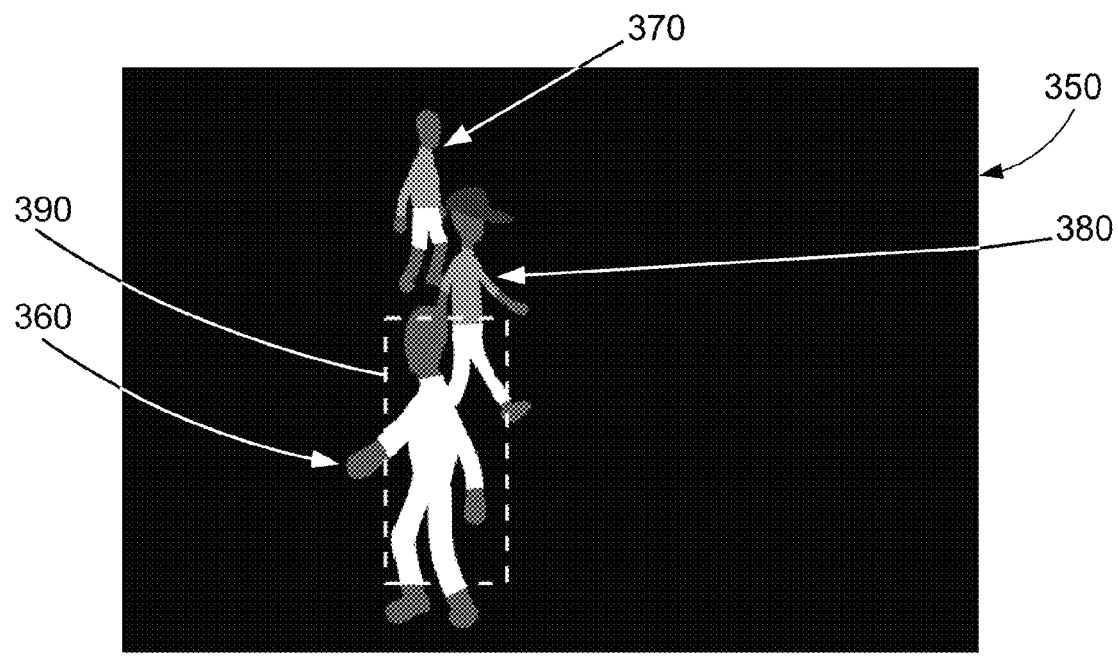

FIG. 3A shows the back projection 300 of the first video frame 100 using the histogram 200 of the person 130 with the cap. In this back projection 300 representation, lighter colour or grey-scale represents areas of higher probability (pixels corresponding to high bin counts in the histogram) and darker colour or grey-scale represents areas of lower probability (pixels corresponding to low bin counts in the histogram). In the histogram 200, the most represented bin 223 shows up strongest in the back projection 300 for each person 310, 320 and 330. In this case the mean-shift step will start at the predicted position, being the location of the bounding box 135, for the track of the person 130 in this frame, and will predict the bounding box 340 for the person, substantially similar to the ground truth bounding box 135. The ground truth is, in this case, the actual position of the person 130. However, in the back projection 350 of the subsequent frame 140 as seen in FIG. 3B, the predicted bounding boxes 155, 165, 175 of each person 360, 370, 380 are superimposed and the mean-shift step, starting at the estimated position of the person 380, will end up giving a bounding box 390 having a location/position much lower down compared with the correct location 175 of FIG. 1B. This error is due to the dominant colour also appearing on the other person 360. It is likely tracking will fail as the track will subsequently likely follow the other person 360.

It is desirable to address or at least ameliorate tracking failures of this nature.

Structural Implementation

Figure 14A:
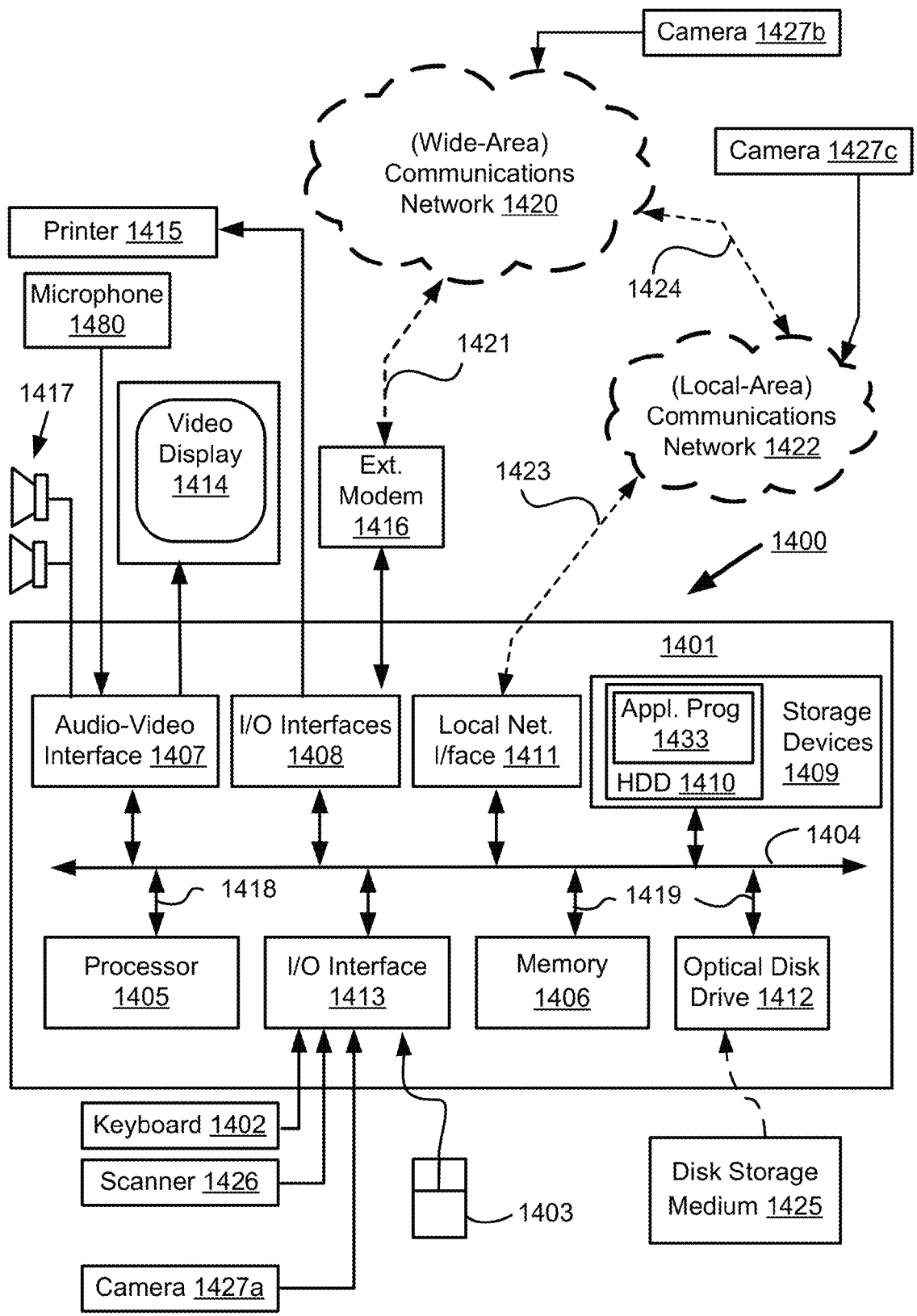
FIGS. 14A and 14B form a schematic block diagram of a general purpose computer system upon which arrangements described can be practiced.
Figure 14B:
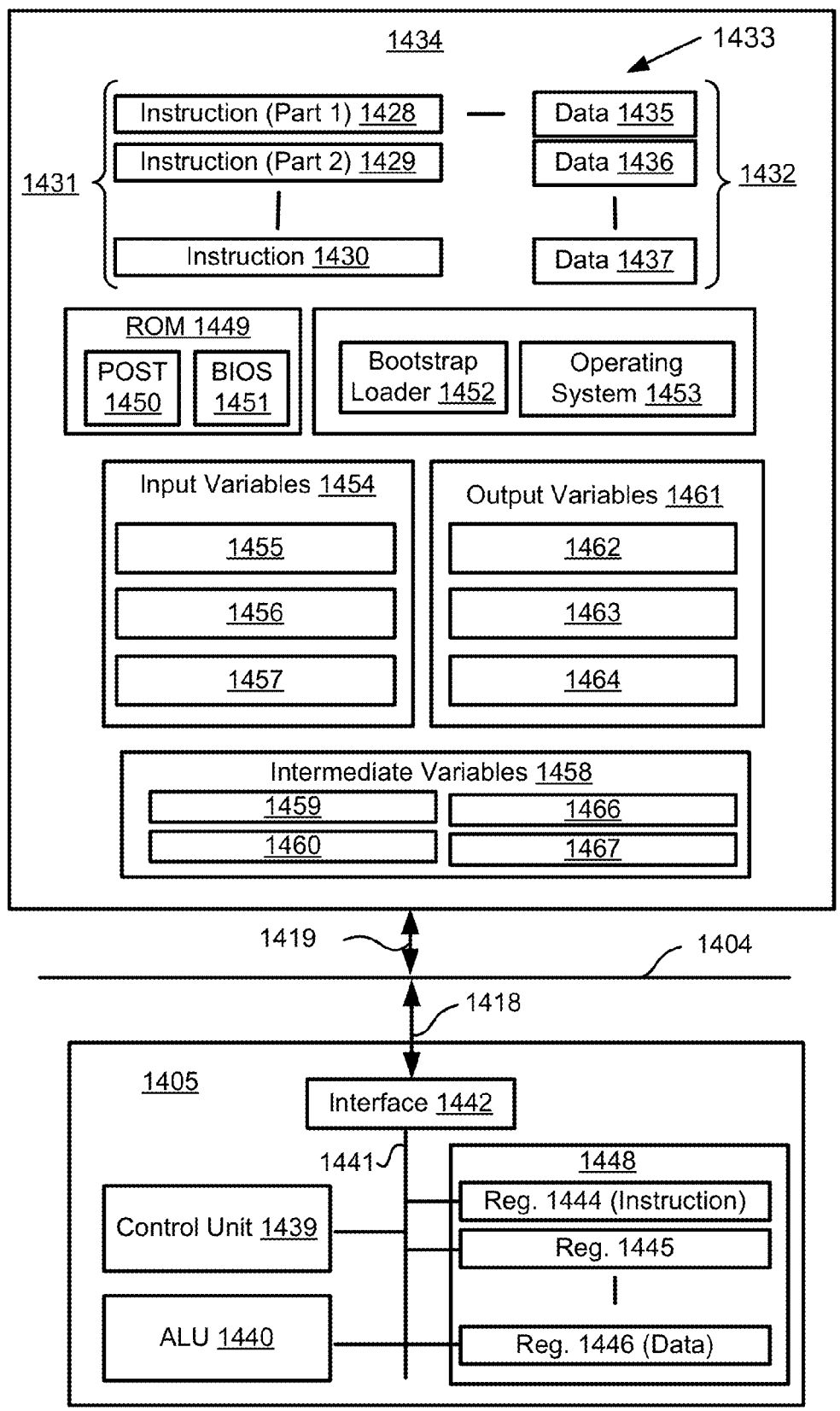

FIGS. 14A and 14B depict a general-purpose computer system 1400, upon which the various arrangements described can be practiced. In this specific implementation, the system 1400 is configured as a video surveillance system by virtue of the presence and operation of a number of video cameras 1427a, 1427b and 1427c.

As seen in FIG. 14A, the computer system 1400 includes: a computer module 1401; input devices such as a keyboard 1402, a mouse pointer device 1403, a scanner 1426, the video camera 1427a, and a microphone 1480; and output devices including a printer 1415, a display device 1414 and loudspeakers 1417. An external Modulator-Demodulator (Modem) transceiver device 1416 may be used by the computer module 1401 for communicating to and from a communications network 1420 via a connection 1421. The communications network 1420 may be a wide-area network (WAN), such as the Internet, a cellular telecommunications network, or a private WAN. Where the connection 1421 is a telephone line, the modem 1416 may be a traditional "dial-up" modem. Alternatively, where the connection 1421 is a high capacity (e.g., cable) connection, the modem 1416 may be a broadband modem. A wireless modem may also be used for wireless connection to the communications network 1420.

The computer module 1401 typically includes at least one processor unit 1405, and a memory unit 1406. For example, the memory unit 1406 may have semiconductor random access memory (RAM) and semiconductor read only memory (ROM). The computer module 1401 also includes an number of input/output (I/O) interfaces including: an audio-video interface 1407 that couples to the video display 1414, loudspeakers 1417 and microphone 1480; an I/O interface 1413 that couples to the keyboard 1402, mouse 1403, scanner 1426, camera 1427 and optionally a joystick or other human interface device (not illustrated); and an interface 1408 for the external modem 1416 and printer 1415. In some implementations, the modem 1416 may be incorporated within the computer module 1401, for example within the interface 1408. The computer module 1401 also has a local network interface 1411, which permits coupling of the computer system 1400 via a connection 1423 to a local-area communications network 1422, known as a Local Area Network (LAN). As illustrated in FIG. 14A, the local communications network 1422 may also couple to the wide network 1420 via a connection 1424, which would typically include a so-called "firewall" device or device of similar functionality. The local network interface 1411 may comprise an Ethernet circuit card, a Bluetooth™ wireless arrangement or an IEEE 802.11 wireless arrangement; however, numerous other types of interfaces may be practiced for the interface 1411.

As illustrated in FIG. 14A, the video camera 1427b is coupled to the WAN/Internet 1420 and the video camera 1427c is coupled to the LAN 1422 by which each, together with the directly coupled video camera 1427a, may provide a stream or sequence of video frames that may be used for a variety of purposes including surveillance, for example for security or behavioural analysis purposes. The arrangements presently disclosed are focussed upon processing of video data received from any one camera 1427, although such may be adapted for operations using input video streams received from a number of cameras.

The I/O interfaces 1408 and 1413 may afford either or both of serial and parallel connectivity, the former typically being implemented according to the Universal Serial Bus (USB) standards and having corresponding USB connectors (not illustrated). Storage devices 1409 are provided and typically include a hard disk drive (HDD) 1410. Other storage devices such as a floppy disk drive and a magnetic tape drive (not illustrated) may also be used. An optical disk drive 1412 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1400.

The components 1405 to 1413 of the computer module 1401 typically communicate via an interconnected bus 1404 and in a manner that results in a conventional mode of operation of the computer system 1400 known to those in the relevant art. For example, the processor 1405 is coupled to the system bus 1404 using a connection 1418. Likewise, the memory 1406 and optical disk drive 1412 are coupled to the system bus 1404 by connections 1419. Examples of computers on which the described arrangements can be practised include IBM-PC's and compatibles, Sun Sparcstations, Apple Mac or a like computer systems.

The method of video processing including object tracking may be implemented using the computer system 1400 wherein the processes of FIGS. 4 to 13, to be described, may be implemented as one or more software application programs 1433 executable within the computer system 1400. In particular, the steps of the method of object tracking are effected by instructions 1431 (see FIG. 14B) in the software 1433 that are carried out within the computer system 1400. The software instructions 1431 may be formed as one or more code modules, each for performing one or more particular tasks. The software may also be divided into two separate parts, in which a first part and the corresponding code modules performs the object tracking methods and a second part and the corresponding code modules manage a user interface between the first part and the user.

The software may be stored in a computer readable medium, including the storage devices described below, for example. The software is loaded into the computer system 1400 from the computer readable medium, and then executed by the computer system 1400. A computer readable medium having such software or computer program recorded on the computer readable medium is a computer program product. The use of the computer program product in the computer system 1400 preferably effects an advantageous apparatus for video object tracking.

The software 1433 is typically stored in the HDD 1410 or the memory 1406. The software is loaded into the computer system 1400 from a computer readable medium, and executed by the computer system 1400. Thus, for example, the software 1433 may be stored on an optically readable disk storage medium (e.g., CD-ROM) 1425 that is read by the optical disk drive 1412. A computer readable medium having such software or computer program recorded on it is a computer program product. The use of the computer program product in the computer system 1400 preferably effects an apparatus for video object tracking.

In some instances, the application programs 1433 may be supplied to the user encoded on one or more CD-ROMs 1425 and read via the corresponding drive 1412, or alternatively may be read by the user from the networks 1420 or 1422. Still further, the software can also be loaded into the computer system 1400 from other computer readable media. Computer readable storage media refers to any non-transitory tangible storage medium that provides recorded instructions and/or data to the computer system 1400 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 1401. Examples of transitory or non-tangible computer readable transmission media that may also participate in the provision of software, application programs, instructions and/or data to the computer module 1401 include radio or infra-red transmission channels as well as a network connection to another computer or networked device, and the Internet or Intranets including e-mail transmissions and information recorded on Websites and the like.

The second part of the application programs 1433 and the corresponding code modules mentioned above may be executed to implement one or more graphical user interfaces (GUIs) to be rendered or otherwise represented upon the display 1414. Through manipulation of typically the keyboard 1402 and the mouse 1403, a user of the computer system 1400 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1417 and user voice commands input via the microphone 1480.

FIG. 14B is a detailed schematic block diagram of the processor 1405 and a "memory" 1434. The memory 1434 represents a logical aggregation of all the memory modules (including the HDD 1409 and semiconductor memory 1406) that can be accessed by the computer module 1401 in FIG. 14A.

When the computer module 1401 is initially powered up, a power-on self-test (POST) program 1450 executes. The POST program 1450 is typically stored in a ROM 1449 of the semiconductor memory 1406 of FIG. 14A. A hardware device such as the ROM 1449 storing software is sometimes referred to as firmware. The POST program 1450 examines hardware within the computer module 1401 to ensure proper functioning and typically checks the processor 1405, the memory 1434 (1409, 1406), and a basic input-output systems software (BIOS) module 1451, also typically stored in the ROM 1449, for correct operation. Once the POST program 1450 has run successfully, the BIOS 1451 activates the hard disk drive 1410 of FIG. 14A. Activation of the hard disk drive 1410 causes a bootstrap loader program 1452 that is resident on the hard disk drive 1410 to execute via the processor 1405. This loads an operating system 1453 into the RAM memory 1406, upon which the operating system 1453 commences operation. The operating system 1453 is a system level application, executable by the processor 1405, to fulfil various high level functions, including processor management, memory management, device management, storage management, software application interface, and generic user interface.

The operating system 1453 manages the memory 1434 (1409, 1406) to ensure that each process or application running on the computer module 1401 has sufficient memory in which to execute without colliding with memory allocated to another process. Furthermore, the different types of memory available in the system 1400 of FIG. 14A must be used properly so that each process can run effectively. Accordingly, the aggregated memory 1434 is not intended to illustrate how particular segments of memory are allocated (unless otherwise stated), but rather to provide a general view of the memory accessible by the computer system 1400 and how such is used.

As shown in FIG. 14B, the processor 1405 includes a number of functional modules including a control unit 1439, an arithmetic logic unit (ALU) 1440, and a local or internal memory 1448, sometimes called a cache memory. The cache memory 1448 typically includes a number of storage registers 1444-1446 in a register section. One or more internal busses 1441 functionally interconnect these functional modules. The processor 1405 typically also has one or more interfaces 1442 for communicating with external devices via the system bus 1404, using a connection 1418. The memory 1434 is coupled to the bus 1404 using a connection 1419.

The application program 1433 includes a sequence of instructions 1431 that may include conditional branch and loop instructions. The program 1433 may also include data 1432 which is used in execution of the program 1433. The instructions 1431 and the data 1432 are stored in memory locations 1428, 1429, 1430 and 1435, 1436, 1437, respectively. Depending upon the relative size of the instructions 1431 and the memory locations 1428-1430, a particular instruction may be stored in a single memory location as depicted by the instruction shown in the memory location 1430. Alternately, an instruction may be segmented into a number of parts each of which is stored in a separate memory location, as depicted by the instruction segments shown in the memory locations 1428 and 1429.

In general, the processor 1405 is given a set of instructions which are executed therein. The processor 1405 waits for a subsequent input, to which the processor 1405 reacts to by executing another set of instructions. Each input may be provided from one or more of a number of sources, including data generated by one or more of the input devices 1402, 1403, data received from an external source across one of the networks 1420, 1402, data retrieved from one of the storage devices 1406, 1409 or data retrieved from a storage medium 1425 inserted into the corresponding reader 1412, all depicted in FIG. 14A. The execution of a set of the instructions may in some cases result in output of data. Execution may also involve storing data or variables to the memory 1434.

The disclosed object tracking arrangements use input variables 1454, which are stored in the memory 1434 in corresponding memory locations 1455, 1456, 1457. The arrangements produce output variables 1461, which are stored in the memory 1434 in corresponding memory locations 1462, 1463, 1464. Intermediate variables 1458 may be stored in memory locations 1459, 1460, 1466 and 1467.

Referring to the processor 1405 of FIG. 14B, the registers 1444, 1445, 1446, the arithmetic logic unit (ALU) 1440, and the control unit 1439 work together to perform sequences of micro-operations needed to perform "fetch, decode, and execute" cycles for every instruction in the instruction set making up the program 1433. Each fetch, decode, and execute cycle comprises:

(i) a fetch operation, which fetches or reads an instruction 1431 from a memory location 1428, 1429, 1430;

(ii) a decode operation in which the control unit 1439 determines which instruction has been fetched; and (iii) an execute operation in which the control unit 1439 and/or the ALU 1440 execute the instruction.

Thereafter, a further fetch, decode, and execute cycle for the next instruction may be executed. Similarly, a store cycle may be performed by which the control unit 1439 stores or writes a value to a memory location 1432.

Each step or sub-process in the processes of FIGS. 4 to 13 is associated with one or more segments of the program 1433 and is performed by the register section 1444, 1445, 1447, the ALU 1440, and the control unit 1439 in the processor 1405 working together to perform the fetch, decode, and execute cycles for every instruction in the instruction set for the noted segments of the program 1433.

The method of video object tracking may alternatively be implemented in dedicated hardware such as one or more integrated circuits performing the functions or sub functions of video processing. Such dedicated hardware may include graphic processors, digital signal processors, or one or more microprocessors and associated memories.

Implementation

Figure 9:
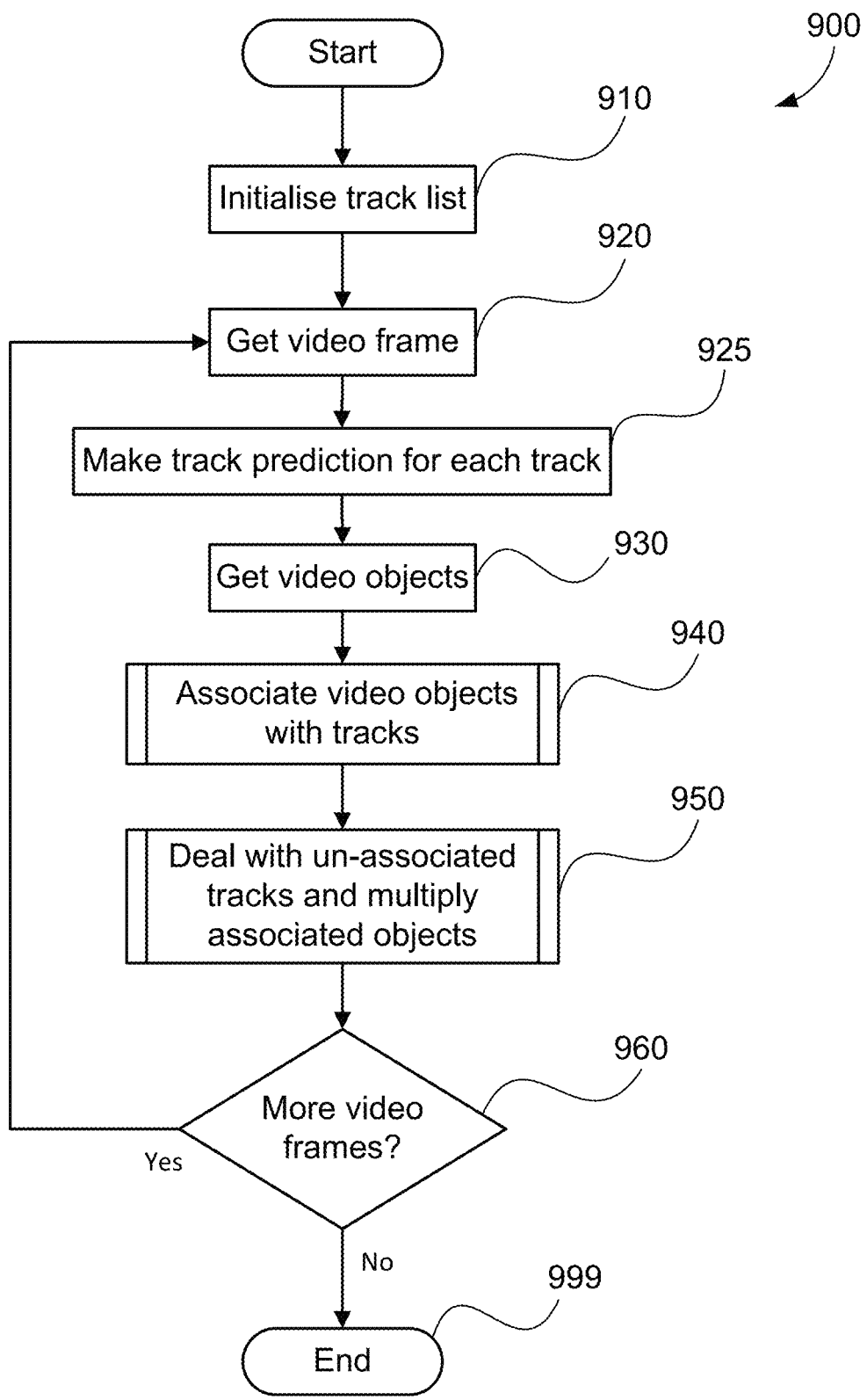
FIG. 9 is a schematic flow diagram illustrating a method of tracking video objects in a scene according to the present disclosure.

In a preferred implementation, a video object tracker is implemented as a software application, for example stored on the HDD 1410 and executable by the processor 1405, to perform a method 900 as described in FIG. 9. Not illustrated in the method 900 are preliminary steps of receiving captured video frames from a camera 1427 and storing video data for each frame in the memory 1406 and/or HDD 1410 whereupon various video processing applications, including the method 900, may operate on the stored frame data. Background objects are typically static in the frame, but may possess some (repetitive and/or confined) movement (e.g. water ripple, tree swaying, escalator movement). The method 900 operates upon foreground objects and tracks associated with such foreground objects. The method 900 starts at a step 910 by initialising an empty track list. Each initialised track data is capable of holding a set of per-frame track state information, including the bounding box of a foreground object, estimated velocity and acceleration, and an optional exemplar image and histogram created using that exemplar image.

The method 900 then proceeds to step 920 whereby the processor 1405 retrieves a frame of video from the memory 1406.

The method 900 then in step 925, for each track in the track list created at step 910, makes a track prediction for the track centroid, based on previous detections for the track. Initially, for the processing of the first frame, the track list is empty, but for the processing of subsequent video frames this list will be populated. In the preferred implementation, the method 900 in step 925 uses a Kalman filter to make predictions of track position, and to estimate velocity and acceleration of the object in each video frame.

In step 930, the processor 1405 operates to analyse the video frame to obtain or otherwise ascertain a set of video objects. The video objects can be blobs detected by a foreground detection subsystem, or bounding boxes detected by a Human Body Detection subsystem, or any of the many frame-based video object detection methods known in the art.

The tracker then in step 940 associates video objects of the set with tracks, either by associating each video object with an existing track or by creating one or more new tracks and associating one or more of the video objects with those new tracks. Step 940 is described in further detail in FIG. 10.

The method 900 then in step 950 deals with any un-associated tracks, being tracks in the track list that were not associated with any video objects from the video object list. The step 950 also deals with multiply associated objects, being video objects that are associated with multiple tracks. In this step 950 the tracker uses a Visual Signature Algorithm to attempt to find a new video object, and depending on any success, and the current state of the track, the tracker allows the track to continue or deletes the track. Step 950 is described in further detail in FIG. 11.

The tracker then in step 960 either goes to the next video frame 920 if there is one, or the method 900 ends at step 999 if there are no further video frames to analyse.

Figure 10:
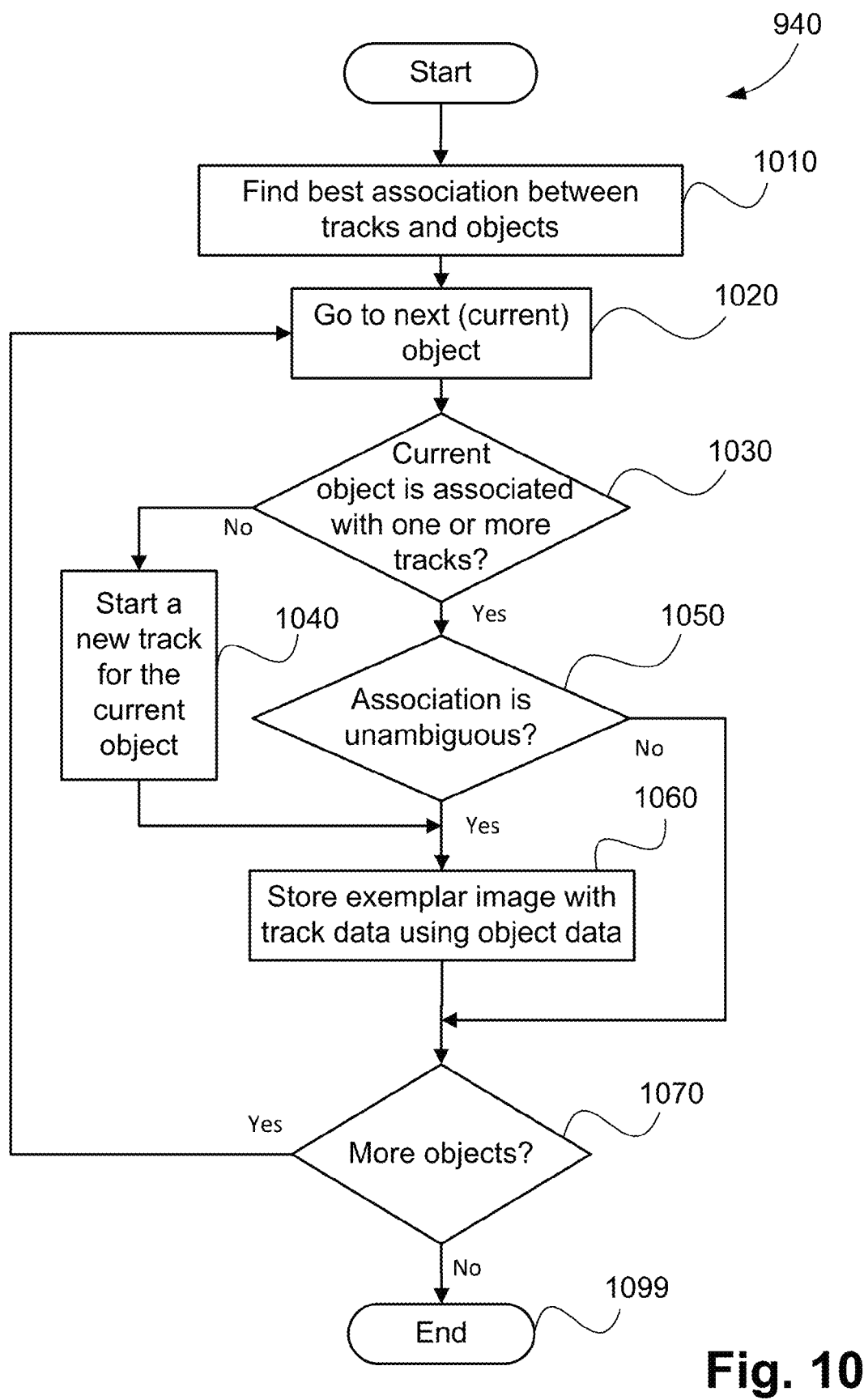
FIG. 10 is a schematic flow diagram illustrating a method of associating video objects with tracks as used in the method of FIG. 9.

A subsystem of the tracker operative for step 940 for associating video objects with tracks is described in further detail in FIG. 10. The subsystem starts with a step 1010 which operates to find the best overall association between the predicted locations of existing tracks, and the video objects detected by step 930 for the current video frame. There are many methods known in the art for performing this association. One example is known as the "greedy" algorithm, performed by creating a score for each potential association between track prediction established at step 925 and video object based on their correspondence in location and size, and iteratively associating the best-scoring correspondences until a score threshold is reached or the list of video objects or tracks are all associated. This association process may result in multiple tracks being associated with a single video object, and/or multiple video objects being associated with a single track. In addition, the association process updates the state of each track with corresponding object data.

The process of FIG. 10 then continues by examining each video object in turn, starting with the first video object, in step 1020.

In step 1030, the process 940 determines whether the current video object was associated with at least one track in step 1010. If the current object was not associated with any track, the process 940 proceeds to step 1040 to start a new track corresponding to the current video object, and then continues to step 1060.

If in step 1030 the current object was associated with at least one track, step 1050 is then performed where the processor 1405 tests whether the object-track association is unambiguous (i.e. the current video object unambiguously represents the current state of the track). If one track is associated with multiple video objects, in a preferred implementation, the object-track association is treated as ambiguous. In an alternate implementation, near proximity of other video objects may also cause the object-track association to be treated as ambiguous. If step 1050 determines that the association is ambiguous, the process 940 proceeds to step 1070. Any threshold of proximity for assessing ambiguity is typically predetermined and can be varied according to the relative sizes of the bounding boxes.

Otherwise, if the association is unambiguous, the process 940 proceeds step 1060 where the processor 1405 stores an exemplar image for the track corresponding to the data of the current video object. The stored exemplar image is used for tracking the video object in the next video frame. For an unambiguous association between a track and a video object, there are two conditions: only one video object overlapping the track, and only one track overlapping the video object. In other words, a one-to-one association.

The process 940 then proceeds to check whether there are any further video objects to analyse in step 1070. If there are, the process 940 then returns to get the next video object in step 1020.

Otherwise, the process 940 concludes at step 1099.

Figure 11:
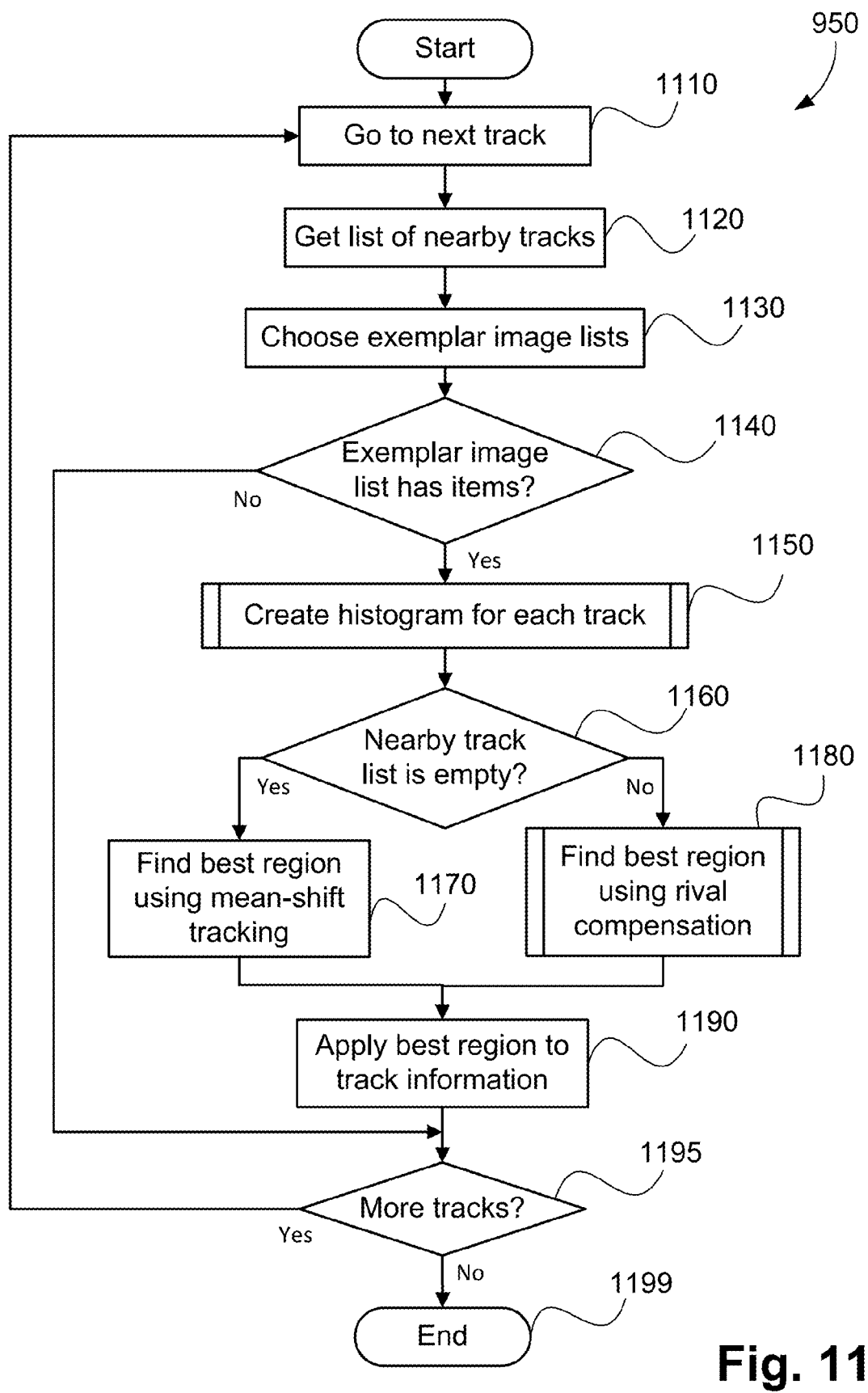
FIG. 11 is a schematic flow diagram illustrating a method of dealing with un-associated and multiply associated tracks as used in the method of FIG. 9.

A preferred subsystem of the tracker for the process 950, responsible for dealing with un-associated tracks, is described in further detail in FIG. 11.

The process 950 shown in FIG. 11 starts by choosing at step 1110 the first track in the track list created at step 910 as the current track.

In step 1120, the process 950 obtains or forms a list of other tracks in the vicinity of the current track (a list of nearby tracks). In one implementation, the list of nearby tracks is compiled by examining the bounding boxes of each of the predicted track locations of video objects for the current frame, and adding each track with predicted bounding boxes overlapping the predicted bounding box of the current track. In another implementation, the list of nearby tracks is compiled by examining the smallest distance between the predicted centroid or bounding box of the current track and the predicted centroid or bounding box of each other track, and adding to the list of nearby tracks those tracks for which this smallest distance falls within a predetermined threshold. In yet another implementation the list of nearby tracks is compiled by examining any video objects associated with the track from step 1010, and adding all other tracks that are also associated with those video objects.

Once the list of nearby tracks is compiled, the process 950 proceeds to step 1130 to choose exemplar image lists for the current track and each of the nearby tracks populating the list of nearly tracks. In one implementation of step 1130, the exemplar image list for a track is simply a single item, being the most recent exemplar image associated with the track, if it exists. In another implementation, the exemplar image list has one or more items for one video object, being the exemplar images associated with a track state that have similarity scores above a set threshold, where the similarity score is a score measuring the similarity between the exemplar image track state and the current estimated track state, using a metric determined using, for example, constant weights applied to differences in track direction, position, bounding box size, and/or aspect ratio. In yet another implementation this similarity score is further weighted by age, so as to prefer more recent exemplar images. In yet another implementation, the exemplar image list is a list consisting of all the exemplar images associated with the track.

Having chosen a list of exemplar images for the current track and the nearby tracks, the process 950 proceeds to a test step 1140 to ascertain whether the exemplar image list of the current track obtained in step 1130 has any items.

If the exemplar image list is empty, the process 950 continues to step 1195 to check whether there are more tracks to be processed.

If there is at least one exemplar image in the exemplar image list, the process 950 continues to step 1150 where the processor 1405 creates a histogram for the current track and each of the nearby tracks. Step 1150 is described in further detail in FIG. 13.

The process 950 then continues to step 1160 which operates to check whether the list of nearby tracks is empty. If it is empty, the process 950 proceeds to step 1170 to use the mean-shift tracking system discussed above to find a best region of the image that matches the track, making use of histogram data for the current track provided earlier 1150. The process 950 then proceeds to step 1190.

If the nearby track list in step 1160 is not empty, the process 950 proceeds to step 1180 to find the best region of the image that matches the track. Step 1180 is described in detail with respect to FIG. 12.

After steps 1170 and 1180, the process 950 then proceeds to step 1190 to apply the found best region to the current track state, and updating the current track state by using the found best region instead of the current ambiguous, erroneous, or absent current video object or objects associated with the track, thereby allowing better future track predictions to be determined at step 925. In an alternative approach, step 1190 can operate to apply the data only if a confidence measure, based on the back projection calculated by steps 1170 and 1180 (to be described), is above a set threshold. In a specific implementation, the confidence measure is equal to the sum of the back-projection value inside the mean-shift bounding box, divided by the sum of the back-projection value in a region of equivalent area immediately outside the mean-shift bounding box.

After step 1190, the process 950 proceeds to a check step 1195 to ascertain whether there are more tracks in the track list. If there are, the process 950 returns to step 1110 to process the next track. Otherwise, the process 950 concludes at step 1199.

Figure 12:
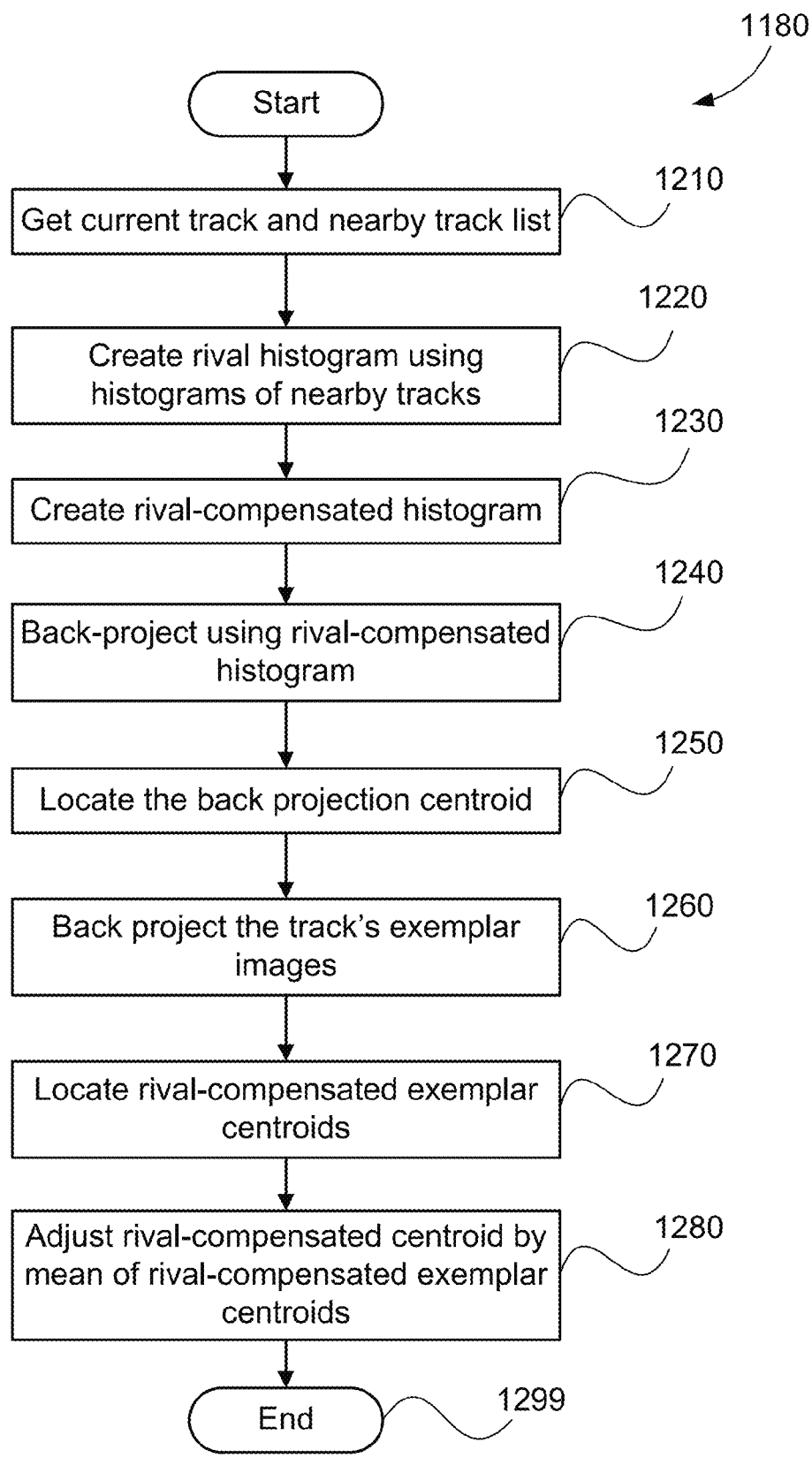
FIG. 12 is a schematic flow diagram illustrating a method of finding the best region of an image using rival compensation as used in the method of FIG. 11.

A subsystem process of the tracker associated with step 1180 is described in more detail in FIG. 12. The process 1180 starts at step 1210 by getting the current track, as defined in the prior step 1110 and the list of nearby tracks, as provided by the prior step 1120.

The process 1180 then continues to step 1220 where the processor 1405 operates to create what the present inventor refers to as a "Rival Histogram" using the histogram of each track in the nearby track list. In a first implementation each rival histogram bin value is simply the sum of the corresponding histogram bin values of the nearby rival tracks. In an alternate implementation, the contributions of each rival track to the rival histogram of the current track are scaled or weighted with a factor inversely proportional to the distance between the rival track prediction position and the current track prediction position, as determined from step 925. The rival histogram is essentially a collated histogram of the rival tracks and relates to the current track under consideration.

Figure 4A:
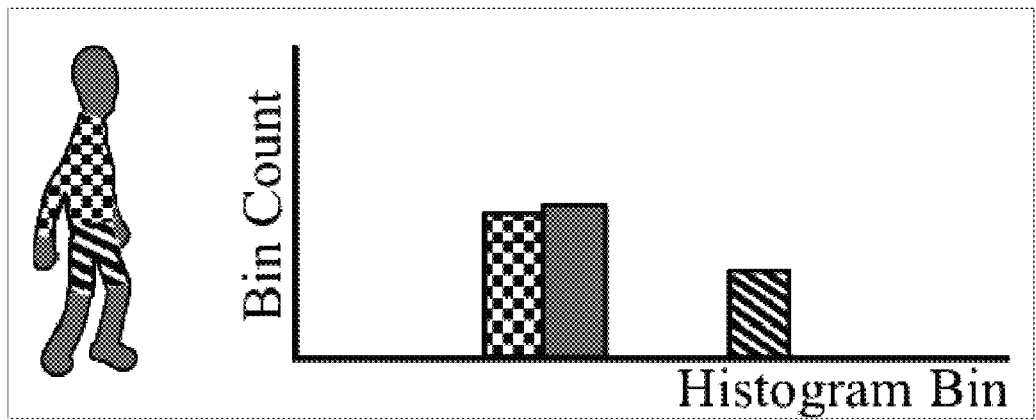
FIGS. 4A to 4C illustrate rival histogram creation, showing two histograms from FIGS. 2B and 2C that get normalised and summed to equal a third histogram.
Figure 4B:
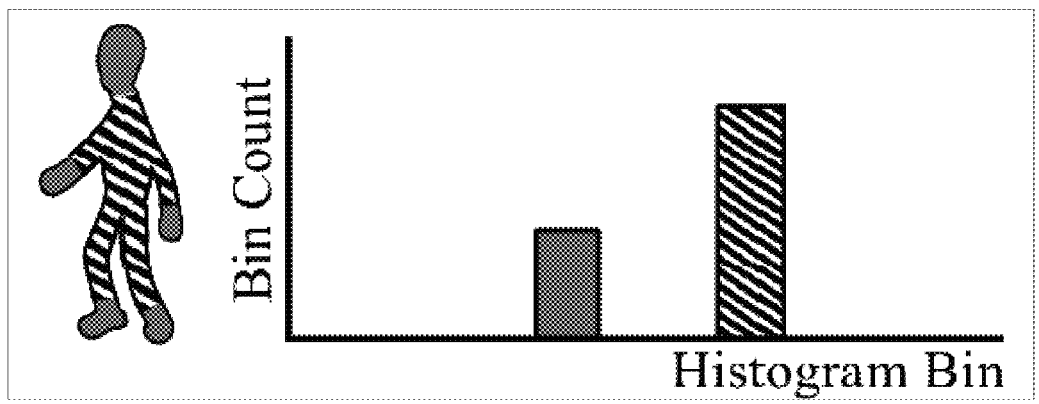
Figure 4C:
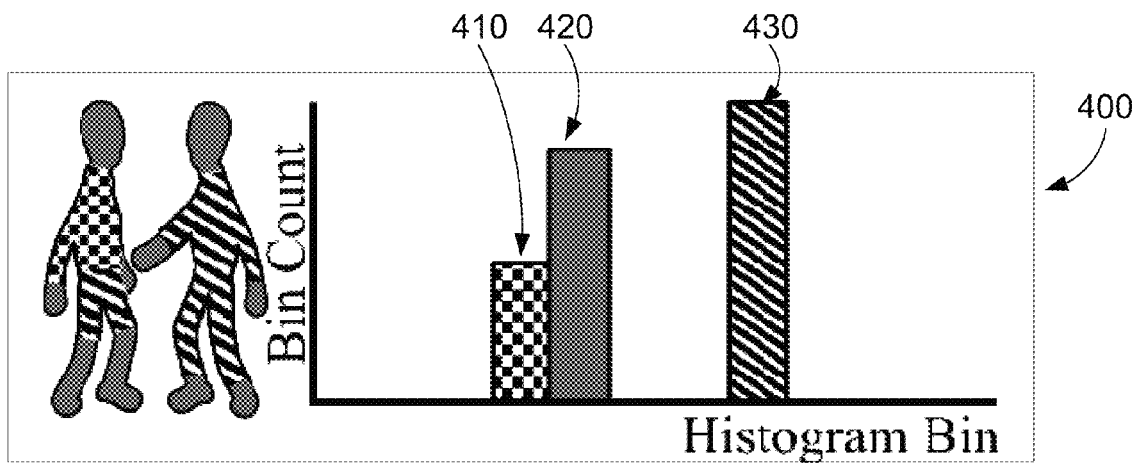

FIGS. 4A to 4C provide an illustration of step 1220 using the scenario of FIGS. 1A and 1B and histograms of FIGS. 2A to 2C. When tracking one person 130 (170) in a frame 140 (i.e. the current track), in which another person 120 (160) overlaps, the tracker system determines in step 1120 that track prediction bounding boxes 155, 165, as established in step 925, for another pair of people 110 (150), 120 (160) overlap the track prediction bounding box for the current track 175. In this case, the exemplar image list for each of the tracks consists of the exemplar images captured in the prior video frame 100. A one dimensional hue histogram is created for each track in step 1150 as illustrated in 200, 240 and 250 in FIGS. 2A to 2C. The histograms 240, 250 for the nearby tracks (corresponding to the people 120 (160) and 110 (150)), as reproduced in FIGS. 4A and 4B respectively, are then combined in step 1220 into one rival histogram 400 seen in FIG. 4C, in which the bin 410 is the sum of the normalised bins 221, 224, the bin 420 is the sum of normalised bins 222, 225, and the bin 430 is the sum of normalised bins 223, 226.

The process 1180 in FIG. 12 then continues to step 1230 where the process 1405 creates a rival-compensated histogram for the current track by attenuating bins of the histogram of the current track that have non-zero values in the corresponding bins of the Rival Histogram determined in step 1220. The rival-compensated histogram is an example of a compensated appearance model that operates to attenuate the appearance features (e.g. colours) that are common or present in the different appearance models (e.g. histograms) of the overlapping objects. In one example implementation, each bin of the histogram of the current track is multiplied by an attenuation factor one minus alpha, where alpha is the bin value of the corresponding rival histogram divided by the maximum rival histogram bin, multiplied by a predefined rival-compensation constant having a value between zero (to minimise rival compensation) and one (to maximise rival compensation). In another implementation, each bin of the histogram of the current track has the corresponding bin of the rival histogram subtracted from it, and adjusted to zero if the result goes below zero. In yet another approach, each bin of the histogram of the current track is multiplied by an attenuation factor equal to the minimum non-zero rival histogram bin divided by the corresponding rival histogram bin.

Figure 5A:
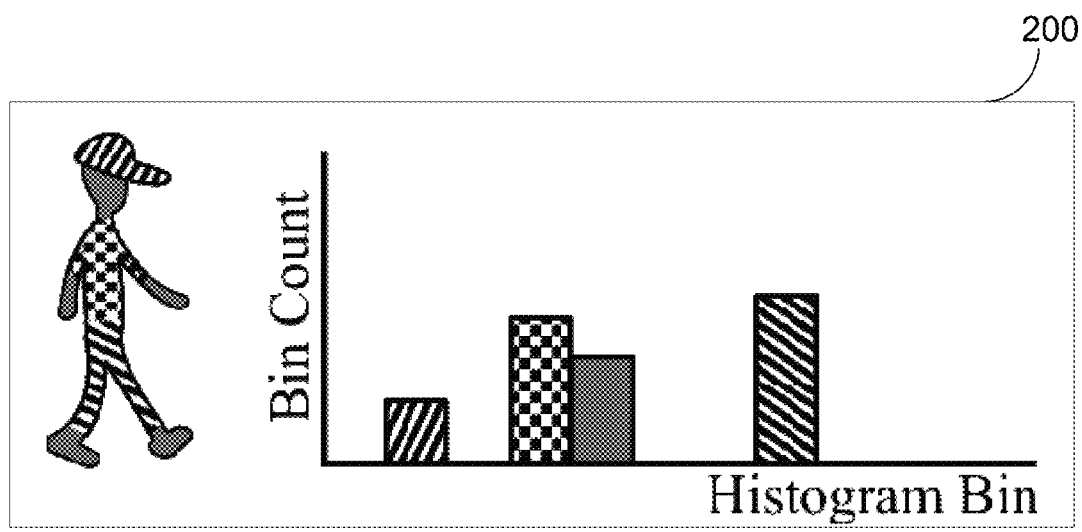
FIGS. 5A to 5C illustrate rival-compensated histogram creation, showing a histogram 500 created by attenuating the histogram from FIG. 2A by the rival histogram from FIG. 4C.
Figure 5B:
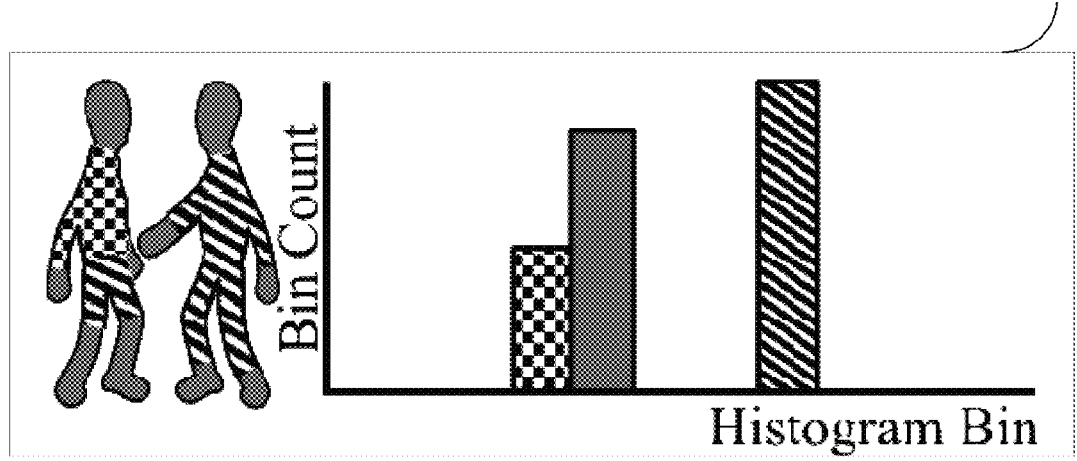
Figure 5C:
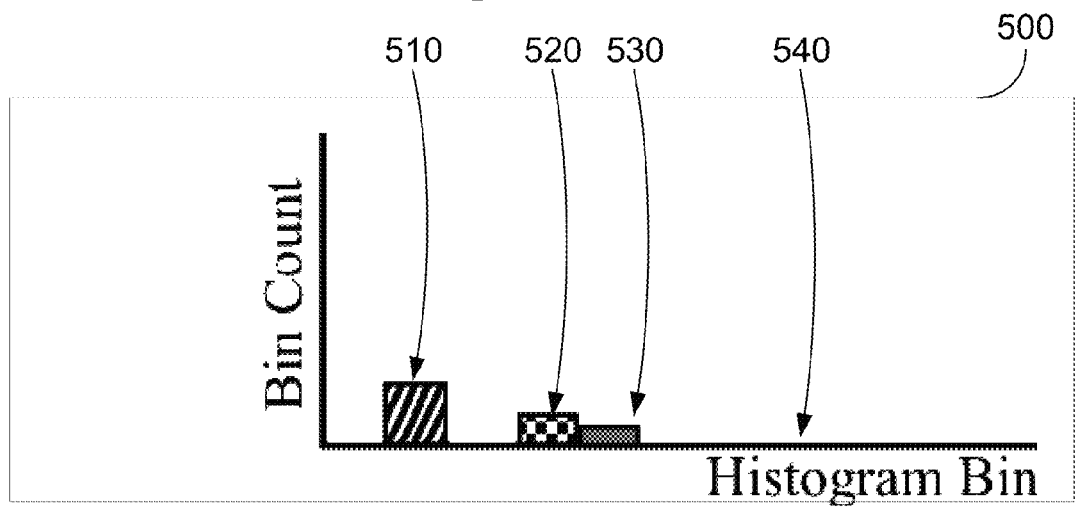

FIGS. 5A to 5C provide an illustration of step 1230. Attenuating the current track histogram 200 (FIGS. 2A, 5A) by the rival histogram 400 (FIGS. 4C, 5B) produces the rival-compensated histogram 500 of FIG. 5C, in which the bin 510 was empty in the rival histogram 400 and was therefore not attenuated, and the other three bins 520, 530, 540 were attenuated to varying degrees due to the presence of corresponding bin values in the rival histogram 400.

The process 1180 then continues 1240 by back-projecting the current video frame (that being processed from step 920) using the rival-compensation histogram from step 1230.

Figure 6:
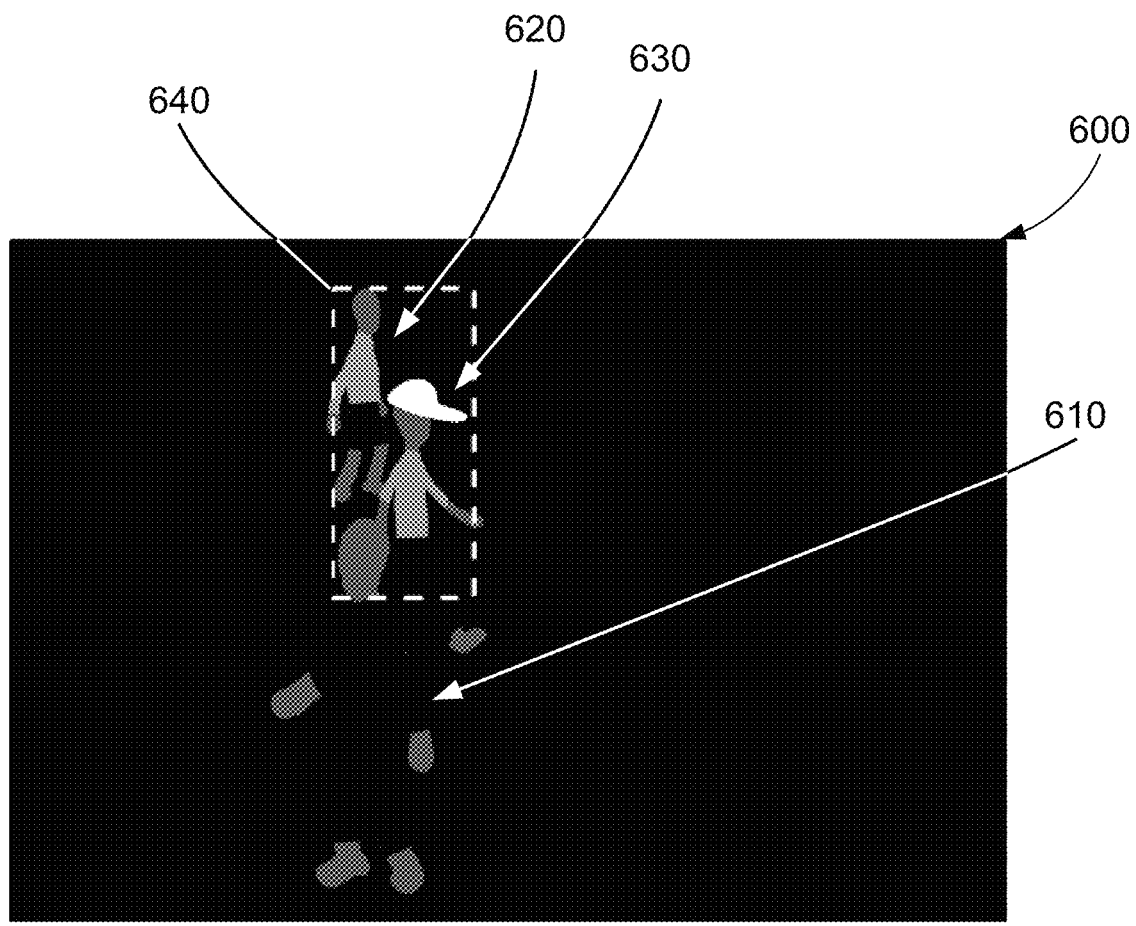
FIG. 6 is an illustration of a back projection and mean-shift predicted bounding box for the video frame 140 of FIG. 1B using the rival-compensated histogram 500.

FIG. 6 provides an illustration of step 1240 using the example of FIG. 1A to FIG. 5C. The back-projection of the rival-compensated histogram 500 can be compared with a back-projection 350 of the normal histogram 200 for the same track 135/175. The back-projection data 600 seen in FIG. 6 corresponding to each of the people 610 (150), 620 (160), 630 (170) completely attenuates according to the value of the bin 540 the colour corresponding to the fullbody outfit of the person 110, the trousers of the person 130 and the shorts of the person 120.

The process 1180 then continues to step 1250 to determine the location of the centroid of the local maxima of the back projection created using the rival-compensated histogram 500 established in step 1240, by performing the mean-shift step using the current track prediction obtained from step 925 as a starting point. This is the rival-compensated centroid. The scale factor for the back projection may also be calculated using the zero moment of the back projection as a measure of its strength and calculating a correspondingly resized bounding box size. The aspect ratio of the exemplar image may be preserved, or a new aspect ratio may be calculated using the relative strengths of the second moments of the back projection.

FIG. 6 also provides an illustration of a bounding-box 640 determined by the mean-shift step. The bounding box 640 is centred on colours more present in the rival-compensated histogram 500, in particular the hat of the person 630 (130) as derived from the histogram bins 223, 510. The centre of the bounding box is the rival-compensated centroid determined at step 1250.

The process 1180 then continues to step 1260 by back-projecting each of the exemplar images obtained at step 1130 associated with the current track, using the rival-compensated histogram 500 in FIG. 5C determined at step 1230. The exemplar images of each of the people are extracted from one of previous video frames (e.g. video frame 100 in FIG. 1A, the exemplar images within the bounding boxes 115, 125 and 135).

Figure 7:
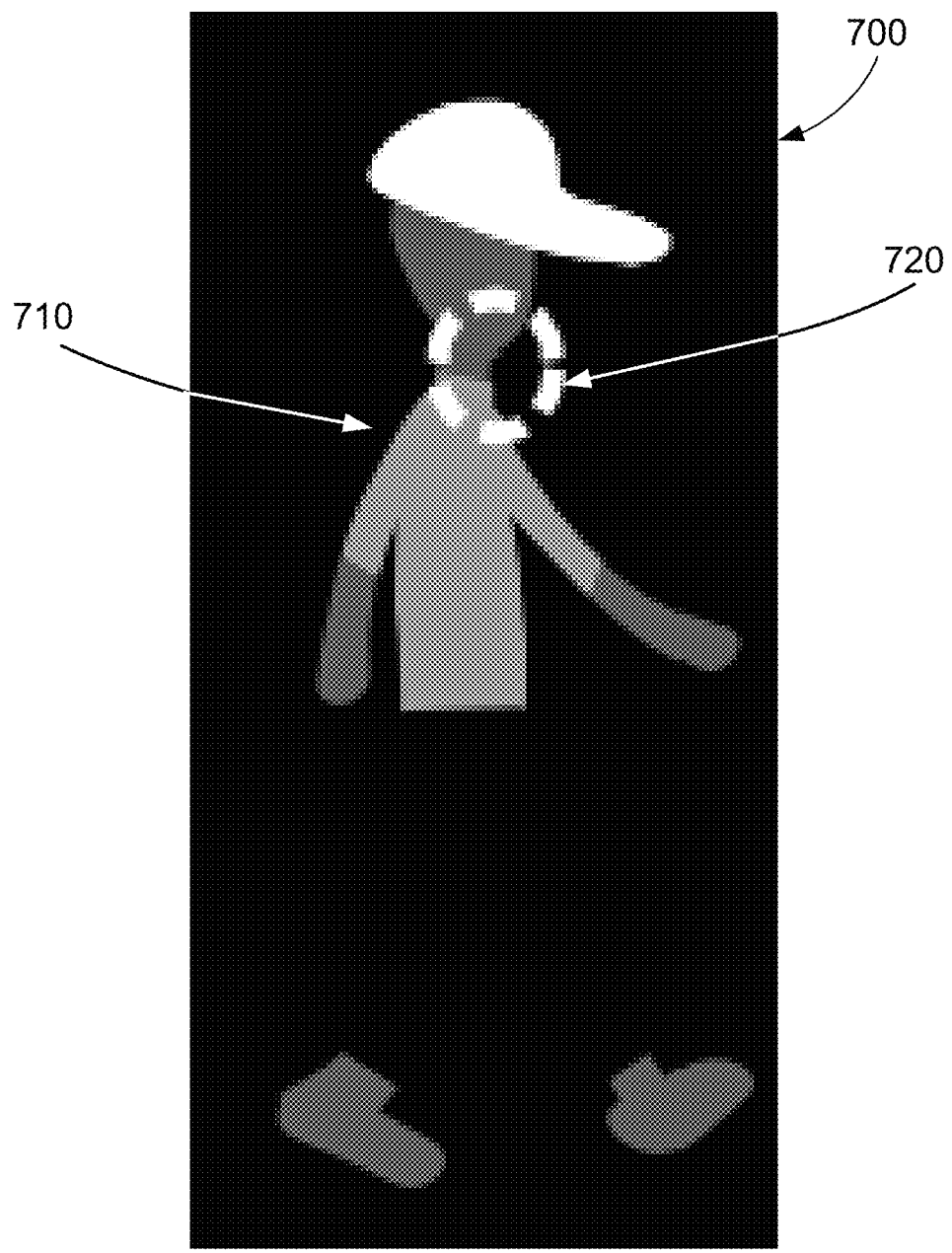
FIG. 7 is an illustration of a back projection and rival-compensated exemplar centroid 720 of the exemplar image 135 using the rival-compensated histogram 500.

FIG. 7 provides an illustration of back-projection 700 of the exemplar image 135 of the person 710 being tracked, using the rival-compensated histogram 500 in FIG. 5C.

The process 1180 then continues to step 1270 where the processor 1405 operates to locate the centroids of the local maxima of the back projections determined at step 1260 of each of the exemplar images, by calculating the zero and first moments of area of each exemplar image back projection (where each back projection is considered for the purposes of moment calculation as a probability distribution). This results in a set of rival-compensated exemplar centroids.

A rival-compensated exemplar delta value, being the distance of the rival-compensated exemplar centroid from the geometric centre of the exemplar image, is then calculated for each rival-compensated exemplar centroid. The delta x value is calculated by subtracting half the exemplar image bounding box width from the rival-compensated exemplar centroid x value. The delta y value is calculated by subtracting half the exemplar image bounding box height from the rival-compensated exemplar centroid y value. (In the foregoing, x means a horizontal direction of the images and y means a vertical direction images).

The mean rival-compensated exemplar delta x value is then calculated by taking the mean of all the rival-compensated exemplar delta x values, and the mean rival-compensated exemplar delta y value is then calculated by taking the mean of all the rival-compensated exemplar delta y values, In the case of FIG. 7, the calculated centroid 720 of the back-projected exemplar image 700 is higher than the geometric centre in the vertical direction, due to the strong value produced by the distinctive hat of the person 130, as evidenced by the histogram bin value 510.

The process 1180 then continues to step 1280 by which the processor 1405 adjusts the rival-compensated centroid from step 1250 using the calculated mean of the rival-compensated exemplar centroids from step 1270. The rival-compensated centroid from step 1250 is moved by subtracting the mean rival-compensated exemplar delta x value from the rival-compensated centroid x value, and by subtracting the mean rival-compensated exemplar delta y value from the rival-compensated centroid y value. In the case of FIG. 7, the exemplar image 700 for people 135 is only one. Therefore, the 'mean' of the rival-compensated exemplar deltas does not have to be calculated. The step 1280 may also rescale the bounding box according to the inverse of the scale factor calculated in step 1250.

Figure 8:
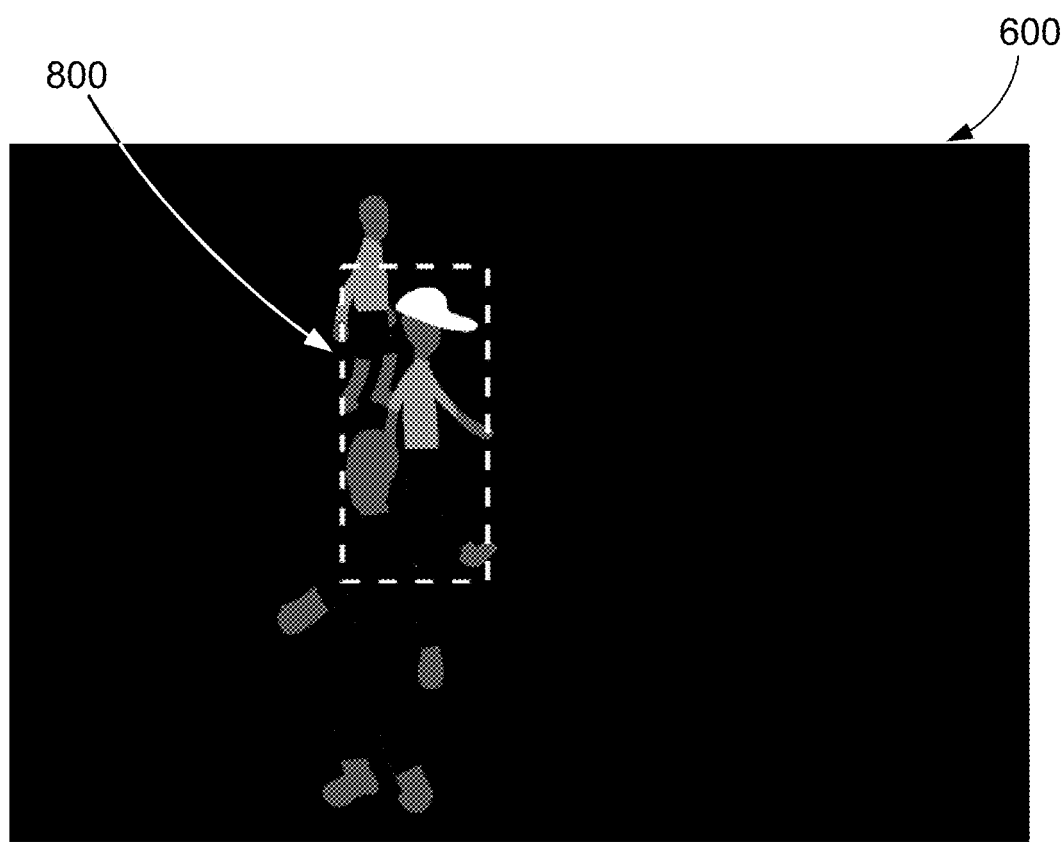
FIG. 8 is an illustration of a rival-compensated back projection 600 showing the bounding box 800 adjusted to take into account the rival-compensated exemplar centroid 720.

FIG. 8 illustrates the same back projection 600 in FIG. 6. The bounding-box 800 for the person 630 being tracked is adjusted downwards in the vertical direction by the same amount as the distance between the centroid 720 and the geometric centre of the exemplar image back projection 700. This bounding box 800 is more accurate than the non-adjusted bounding box 640.

The process 1180 then concludes 1299.

Figure 13:
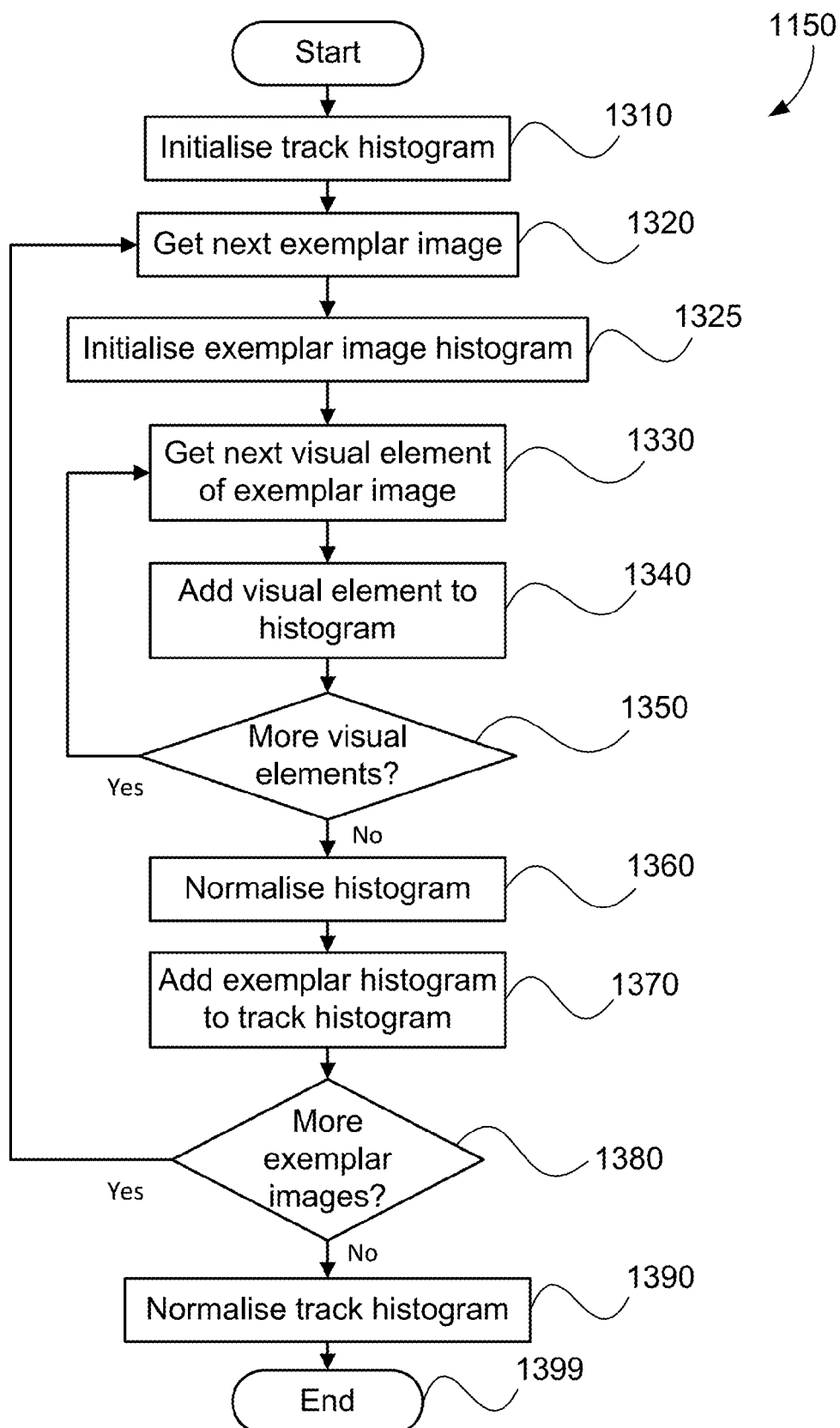
FIG. 13 is a schematic flow diagram illustrating a method of creating a histogram for each track as used in the method of FIG. 11.

A subsystem of the tracker for the process of step 1150 for creating a histogram for each track is described in further detail in FIG. 13. The process 1150 begins 1310 by initialising the track histogram. In one implementation the histogram is a three dimension histogram in the colour space YCbCr. In an alternate implementation the histogram is a one dimensional histogram using Hue, and using thresholds to exclude visual elements that have low saturation or value. In a further alternate implementation the histogram is a three dimensional histogram in the colour space RGB.

The process 1150 then continues step 1320 to get the next exemplar image in the list determined at step 1130, as the current exemplar image.

The process 1150 then continues to step 1325 by initialising a histogram for the exemplar image. This histogram is of the same size and type as the track histogram initialised at step 1310.

Step 1330 follows, where the processor 1405 gets the next visual element of the current exemplar image. In one implementation, the visual element is a pixel. In an alternate example, the visual element is a JPEG block of pixels, for example where the frame being processed is a JPEG or MPEG encoded frame.

In step 1340 which follows, the processor 1405 increments the bin count of the histogram bin corresponding to the visual element selected at step 1330.

The process 1150 then continues to step 1350 where the processor 1405 checks whether there are any more visual elements in the exemplar image. If there are, the process 1150 returns to step 1330 to obtain the next visual element of the exemplar image 1330.

Where there are no more visual elements, the process 1150 continues to step 1360 to normalise the histogram, by dividing each bin value by the maximum bin value of the histogram. In an alternate approach, each bin value is subsequently multiplied by a scale factor proportional to the similarity score of the alternate implementation of step 1130 discussed above. This operates to adjust the appearance model of the object represented by the exemplar view defined by the corresponding bounding box.

The process 1150 then continues to step 1370 where the processor 1405 adds the exemplar histogram to the track histogram. This is done by adding each bin in the exemplar histogram to the corresponding bin of the track histogram.

Then, at step 1380, a check is performed as to whether there are any more exemplar images to process. If there are, the process 1150 returns to process the next exemplar image at step 1320.

Otherwise, the process 1150 continues to step 1390 by normalising the track histogram, by dividing each bin value by the maximum bin value of the histogram.

The process 1150 then concludes 1399.

With the various approaches described, one or more visually similar tracks of can be resolved across a number of video frames. This can be most useful to provide improved tracking in crowded situations. Notably, experiments conducted by the present inventor reveal that the described arrangements afford good performance for the ability to track distinct objects, good performance in the ability to track partially occluded objects, good performance in the ability to track visually similar objects, and good performance in respect of the ability to track position accuracy through groups of objects. Further the arrangements present disclosed do not significantly increase computational complexity, thereby permitting implementation of the methods of FIGS. 9 to 13 in firmware, for example in an embedded processor associated with one of the cameras 1427. Such an implementation can provide for the camera to output, in addition or as an alternative to image pixel data, tracking data associated with one or more tracks obtained within the field of view of the camera. Such can facilitate a significant reduction of bandwidth in a surveillance system having multiple such cameras, and further provide for a centralised controller processor to assimilate the tracks from a number of cameras 1427 to thereby track objects reliably across a number of fields of view.

In the arrangements described, rival compensation is used to more accurately track overlapping objects (e.g. the man wearing the hat in FIGS. 1A-5C), and scale and centroid correction is used (FIGS. 6-8) to correct for bounding box errors that may arise in the tracking of the overlapping objects. Both approaches may be used independently, or in combination, to achieve improved tracking of overlapping objects.

INDUSTRIAL APPLICABILITY

The arrangements described are applicable to the computer and data processing industries and particularly for the video surveillance industry, for example for security and consumer behaviour analysis.

The foregoing describes only some embodiments of the present invention, and modifications and/or changes can be made thereto without departing from the scope and spirit of the invention, the embodiments being illustrative and not restrictive.

The invention claimed is:

1. A method for tracking a first object across a number of images, the method comprising:
   obtaining and storing an exemplar view for the first object and an associated appearance model thereof in a first image;
   forming, in association with a second image, an adjusted colour appearance model of the first object based on the associated appearance model of the first object and an appearance model of at least one second object which is located within a predetermined distance from the first object;
   determining a scale and centroid adjustment of the exemplar view based on the adjusted colour appearance model;
   applying tracking to the first object in the second image to determine a position of the first object in the second image; and
   correcting the position of the first object in the second image according to the determined scale and centroid adjustment.

2. A method according to claim 1, in which the adjusted appearance model comprises a compensated appearance model formed by attenuating common appearance features amongst the corresponding appearance models of at least the nearby second object.

3. A method for tracking a first object across a number of images, the method comprising:
   obtaining and storing an exemplar view for the first object and an associated appearance model thereof in a first image;
   forming, in association with a second image, an adjusted colour appearance model of the first object based on the associated appearance model of the first object and an appearance model of at least one second object which is located within a predetermined distanced from the first object;
   determining a centroid adjustment of the exemplar view based on the adjusted appearance model;
   applying tracking to the first object in the second image to determine a position of the first object in the second image; and
   correcting the position of the first object in the second image according to the determined centroid adjustment.

4. A method according to claim 3, in which the adjusted appearance model comprises a compensated appearance model formed by attenuating common appearance features amongst the corresponding appearance models of at least the nearby second object.

5. A non-transitory computer readable storage medium having a program recorded thereon, the program being executable by a processor to perform a method to track a first object across a number of images, the method comprising:
   obtaining and storing an exemplar view for the first object and an associated appearance model thereof in a first image;
   forming, in association with a second image, an adjusted colour appearance model of the first object based on the associated appearance model of the first object and an appearance model of at least one second object which is located within a predetermined distance from the first object;
   determining a scale and centroid adjustment of the exemplar view based on the adjusted colour appearance model;
   applying tracking to the first object in the second image to determine a position of the first object in the second image; and
   correcting the position of the first object in the second image according to the determined scale and centroid adjustment.

6. A non-transitory computer readable storage medium according to claim 5, in which the adjusted appearance model comprises a compensated appearance model formed by attenuating common appearance features amongst the corresponding appearance models of at least the nearby second object.

7. A non-transitory computer readable storage medium having a program recorded thereon, the program being executable by a processor to perform a method to track a first object across a number of images, the method comprising:
   obtaining and storing an exemplar view for the first object and an associated appearance model thereof in a first image;

forming, in association with a second image, an adjusted colour appearance model of the first object based on the associated appearance model of the first object and an appearance model of at least one second object which is located within a predetermined distance from the first object;

determining a centroid adjustment of the exemplar view based on the adjusted colour appearance model;

applying tracking to the first object in the second image to determine a position of the first object in the second image; and correcting the position of the first object in the second image according to the determined centroid adjustment.

8. A non-transitory computer readable storage medium according to claim 7, in which the adjusted appearance model comprises a compensated appearance model formed by attenuating common appearance features amongst the corresponding appearance models of at least the nearby second object.

* * * * *